United States Patent
Viola

(10) Patent No.: US 12,307,483 B2
(45) Date of Patent: May 20, 2025

(54) ADVERTISEMENT AND PROMOTIONAL ASSET MANAGEMENT METHOD AND SYSTEM

(71) Applicant: Wiki Wiki LLC, Corona Del Mar, CA (US)

(72) Inventor: Mylinda Viola, Corona Del Mar, CA (US)

(73) Assignee: Wiki Wiki LLC, Corona Del Mar, CA (US)

( * ) Notice: Subject to any disclaimer, the term of this patent is extended or adjusted under 35 U.S.C. 154(b) by 0 days.

(21) Appl. No.: 16/510,468

(22) Filed: Jul. 12, 2019

(65) Prior Publication Data

US 2020/0019987 A1    Jan. 16, 2020

Related U.S. Application Data

(60) Provisional application No. 62/697,300, filed on Jul. 12, 2018.

(51) Int. Cl.
   *G06Q 30/02*    (2023.01)
   *G06F 40/30*    (2020.01)
   (Continued)

(52) U.S. Cl.
   CPC ......... *G06Q 30/0252* (2013.01); *G06F 40/30* (2020.01); *G06V 30/413* (2022.01); *G06F 3/0482* (2013.01); *G06F 3/0484* (2013.01)

(58) Field of Classification Search
   CPC ... G06Q 30/0252; G06F 40/30; G06F 3/0484; G06F 3/0482; G06F 40/253; G06K 9/46;
   (Continued)

(56) References Cited

U.S. PATENT DOCUMENTS 8,676,615 B2    3/2014  Callaghan et al.
8,862,500 B1 *  10/2014 Mayfield ............... G06Q 30/02
                                                705/14.58
(Continued)

FOREIGN PATENT DOCUMENTS

WO    2011159811    12/2011
WO    20122162721   12/2012
WO    2014138779    9/2014

OTHER PUBLICATIONS

"Outdoor Company Signage Mockup Generator" (published on Apr. 12, 2018 at https://mediamodifier.com/mockup/outdoor-company-signage-mockup-generator/1399) (Year: 2018).*

*Primary Examiner* — James M Detweiler
(74) *Attorney, Agent, or Firm* — K&L Gates LLP

(57) ABSTRACT

Systems, methods, and apparatuses for a computerized sponsorship exchange are disclosed. In an example, a method includes receiving a selection from a user device of advertising space of a venue for a specified date, time, and/or game and causing the user device to display an upload interactive user interface that prompts a user to provide advertising content for the advertising space. The upload interactive user interface includes a preview picture of the advertising space such that the advertising space is shown as a blank section. The method also includes receiving advertising content from the user device and rendering the received advertising content for display in the blank section for the advertising space within the preview picture. The method further includes causing the user device to display the rendered advertising content within the preview picture at the location of the advertising space.

19 Claims, 27 Drawing Sheets

(51) Int. Cl.
  *G06Q 30/0251* (2023.01)
  *G06V 30/413* (2022.01)
  *G06F 3/0482* (2013.01)
  *G06F 3/0484* (2022.01)

(58) Field of Classification Search
  CPC . G06K 2209/01; G06K 9/00456; G06V 30/10
  See application file for complete search history.

(56) References Cited

U.S. PATENT DOCUMENTS

| | | | | |
|---|---|---|---|---|
| 9,106,887 | B1* | 8/2015 | Owen | H04L 47/52 |
| 2003/0046162 | A1* | 3/2003 | Nestel | G06Q 30/02 |
| | | | | 705/14.66 |
| 2007/0136133 | A1* | 6/2007 | Li | G06Q 30/02 |
| | | | | 705/14.57 |
| 2008/0052150 | A1* | 2/2008 | Grouf | G06Q 30/02 |
| | | | | 705/14.48 |
| 2009/0276317 | A1* | 11/2009 | Dixon | G06Q 10/087 |
| | | | | 705/14.61 |
| 2010/0118200 | A1* | 5/2010 | Gelman | H04N 21/4131 |
| | | | | 348/739 |
| 2012/0105431 | A1* | 5/2012 | Williams | G06T 15/50 |
| | | | | 358/1.15 |
| 2013/0159869 | A1* | 6/2013 | Faraji | G06F 3/0482 |
| | | | | 715/738 |
| 2013/0339906 | A1* | 12/2013 | Barthelt | G06Q 30/0643 |
| | | | | 715/850 |
| 2014/0026153 | A1* | 1/2014 | Sorlander | G06Q 30/02 |
| | | | | 725/5 |
| 2014/0188634 | A1 | 7/2014 | Puntoriero | |
| 2014/0337137 | A1* | 11/2014 | Robertson | G06Q 30/0264 |
| | | | | 705/14.61 |
| 2015/0100869 | A1* | 4/2015 | Sunshine | G06F 40/134 |
| | | | | 715/205 |
| 2015/0150068 | A1* | 5/2015 | Schler | H04N 21/812 |
| | | | | 725/116 |
| 2016/0019599 | A1 | 1/2016 | Puntoriero | |
| 2016/0071167 | A1* | 3/2016 | Jingle | G06Q 30/0275 |
| | | | | 705/14.71 |
| 2017/0026678 | A1* | 1/2017 | Smith | H04N 21/482 |
| 2018/0084310 | A1* | 3/2018 | Katz | G06N 3/045 |
| 2018/0308141 | A1* | 10/2018 | Beck | G06Q 20/1085 |
| 2018/0330403 | A1* | 11/2018 | Olivieri | G06Q 30/0242 |

* cited by examiner

FIG. 18

ADVERTISEMENT AND PROMOTIONAL ASSET MANAGEMENT METHOD AND SYSTEM

PRIORITY CLAIM

The present application claims priority to and the benefit of U.S. Provisional Patent Applications No. 62/697,300, filed on Jul. 12, 2018, the entirety of which is incorporated herein by reference.

BACKGROUND

Entertainment/sports venues, such as stadiums, arenas, centers, etc. generally have one feature in common: advertisements and promotional content. Regardless of event hosted, each venue attempts to increase event revenue by selling advertisement and promotional space. Advertisements or promotional material displayed in a venue during an event can be viewed by 10,000 to 120,000 spectators and potentially millions of at-home viewers.

Generally, venues provide space for advertisements around a court or field, in concourse areas, inside a stadium bowl area, on an exterior of a venue, on outdoor marquis, and on floor-level boards and partitions. Advertisements or promotional content are also displayed via video boards placed throughout venues, including banner boards, small screens, central scoreboards, and jumbotrons. Venues even sell naming rights to not only the venue itself, but also to smaller halls and interior locations of distinction. Essentially, any free space or video board in a venue contains an advertisement, company logo, or promotional content.

Currently, venue operators employ groups of sales teams (or use resellers) to sell advertising and promotional space to sponsors or companies. The process is generally manual, where sponsors or companies select the locations in a venue for their advertisements. The sponsors or companies then manually provide files with the advertising content for loading into the venue's system. For efficiency, sales teams generally target larger sponsors or companies since these entities usually purchase large quantities of advertising space for extended periods of time. Since the process is generally manual, the sales teams do not sell individual spaces in a venue or sell spaces for short durations of time. As a result, a significant number of small and medium sized entities do not have access to venue space for advertisements or promotions. As a result of the labor intensive sales process, it is estimated that approximately $1,000,000,000 of advertisement and/or promotional inventory is unsold and wasted each year across the 142 professional teams in North America in the 5 major sports leagues. This number is significantly higher when collegiate, semi-professional, and non-sports venues are considered, not to mention venues outside of North America.

SUMMARY

The present disclosure is directed to a system, method, and apparatus configured to provide a computerized sponsorship exchange that enables teams, clubs, sports franchises, and venue operators to sell advertising space directly to companies, businesses, or organizations that desire to purchase advertising space with minimal use of intermediaries or staff. The example system, method, and apparatus enable teams, clubs, sports franchises, and venue operators to specify or define advertising space that is available for purchase. This includes specifying specific locations in a venue, advertising space, and/or electronic display parameters. In addition, this includes specifying dates/times in which events are to occur.

The example system, method, and apparatus disclosed herein provide advertising and/or promotional space available to advertisers (e.g., businesses) for purchase. In some embodiments, the example system, method, and apparatus provide an interactive interface that displays an available inventory of advertisement space for a venue. A potential purchaser uses the interactive interface to preview and select available inventory space for purchase. The potential purchaser also provides advertising content (e.g., an advertisement) that is to be displayed at the purchased inventory space. The interactive interface enables a potential purchaser to bundle advertisement space for different locations and/or dates. As such, the interactive interface enables an advertiser to select as little or as much available inventory of advertisement space for purchase based on team-specific parameters and/or thresholds with no interaction with sales staff. The interactive interface also permits a purchaser to track which advertisement spaces have been purchased for multiple venues. The example system, method, and apparatus also enable an advertiser to purchase multiple venues with ease, and in one order.

In some embodiments, the example system, method, and apparatus may validate advertisement or promotional material for display in a purchased space. This may include verifying a file format and/or analyzing the content to be displayed. In some embodiments, the system, method, and apparatus may electronically transmit the validated content to a server of a venue scheduling system for display at the specified dates/times.

In some embodiments, the system, method, and apparatus disclosed herein provide a virtual visualization of promotional campaigns purchased by an advertiser. The system, method, and apparatus are configured to render advertising content or artwork provided by the advertiser in a virtual representation of the promotional space as if the content was displayed live. The system, method, and apparatus may also provide recommendations to a business advertiser based on currently purchased advertisements and/or promotions. The recommendations may be venue specific, regional, or national, which enable an advertiser to optimize their investments in advertisements for concentrated or wide-spread viewer exposure. For example, the system, method, and apparatus may recall or otherwise determine that an advertiser previously purchased advertisements for display during the fourth quarter of a basketball game at the United Center®. The example system, method, and apparatus may determine and/or recommend that electronic billboard marquis at the United Center® are available for purchase as well as other advertising spaces within nearby sports venues.

Further, the example system, method, and apparatus disclosed herein provide on-demand sponsorship and advertising buying opportunities that are available to any entity regardless of size (as long as set parameters and minimum purchase thresholds, as specified by teams, are satisfied). For example, the system, method, and apparatus enable small companies with limited resources to purchase advertising space that was previously only available to large budget enterprises. The example system, method, and apparatus provide large entities more flexibility in scheduling their promotional campaigns and changing their campaigns overtime.

In an example embodiment, a computerized sponsorship exchange system includes a memory device configured to store a data structure that includes specification information for advertising spaces for a plurality of venues. The specification information for each advertising space includes at least one of a date, a time, or a game that each of the advertising spaces are available for purchase, a purchase price, a preview picture of the respective advertising space within the venue where the advertising space is shown as a blank section, and space parameters identifying at least one of a location, boundary, or area of the advertising space within the preview picture. The system also includes an interface controller configured to provide interactive user interfaces for user devices to enable the display and purchase of the advertising spaces in the venues, and a processor communicatively coupled to the memory and the interface controller. The processor in cooperation with the interface controller is configured to receive a selection, from a user device, of an advertising space for at least one of a specified date, a time, or a game for a particular venue and cause the user device to display an upload interactive user interface that prompts a user to provide advertising content for the selected advertising space. The upload interactive user interface includes the preview picture of the advertising space with the advertising space shown as the blank section. The processor in cooperation with the interface controller is also configured to receive advertising content from the user device and render the received advertising content to replace the blank section of the advertising space within the preview picture using the space parameters. The processor in cooperation with the interface controller is further configured to cause the user device to display the rendered advertising content within the preview picture at the location of the advertising space, receive an acceptance to compete the purchase of the advertising space for the advertising content, and reserve the advertising space for the received advertising content for the at least one of the specified date, the time, or the game for the particular venue.

In another embodiment, a computerized sponsorship exchange method includes storing, in a memory device, specification information for an advertising space of a venue. The specification information includes at least one of a date, a time, or a game that the advertising space is available for purchase, a purchase price, a preview picture of the advertising space within the venue where the advertising space is shown as a blank section, and space parameters identifying at least one of a location, boundary, or area of the advertising space within the preview picture. The method also includes receiving, in a processor, a selection from a user device of the advertising space for at least one of a specified date, a time, or a game, and causing, via the processor, the user device to display an upload interactive user interface that prompts a user to provide advertising content for the advertising space, the upload interactive user interface including the preview picture of the advertising space with the advertising space shown as the blank section. The method further includes receiving, in the processor, advertising content from the user device, and rendering, via the processor, the received advertising content for display in the blank section for the advertising space within the preview picture using the space parameters that are stored in the memory device. Additionally, the method includes causing, via the processor, the user device to display the rendered advertising content within the preview picture at the location of the advertising space.

The advantages discussed herein may be found in one, or some, and perhaps not all of the embodiments disclosed herein. Additional features and advantages are described herein, and will be apparent from the following Detailed Description and the figures.

BRIEF DESCRIPTION OF THE FIGURES

FIGS. 17 and 18 show diagrams of user interfaces that includes search results based on different searches entered into the user interface of FIG. 16, according to example embodiments of the present disclosure.

DETAILED DESCRIPTION

Figure 1:
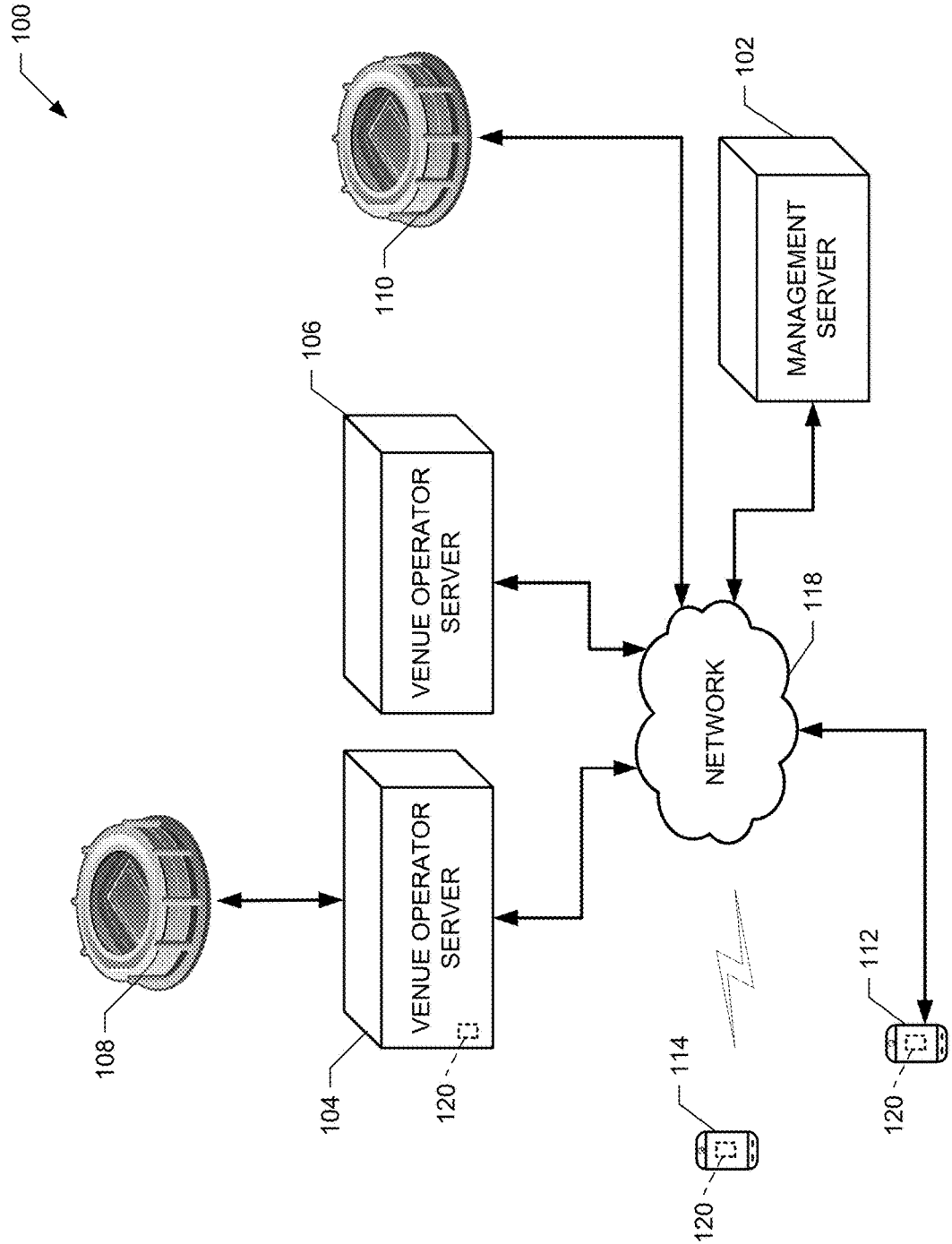
FIG. 1 shows an example sponsorship system including a management server that enables venue operators to sell sponsorship opportunities to advertisers, according to an example embodiment of the present disclosure.

The present disclosure relates in general to a method, system, and apparatus configured to provide automated management of sponsorship space for a venue. While the disclosure discusses features for a single brand or company, it should be appreciated that the example method, system, and apparatus are configured to enable a single entity to manage and/or combine multiple brands, advertising campaigns, and/or tradenames. Further, while the disclosure discusses an operator for a single venue, the example method, system, and apparatus disclosed herein enable a manager to view/track/sell sponsorships for all venues under control, including for example, combining sponsorship opportunities for multiple venues. The example method, system, and apparatus may be used for virtually any type of sporting or entertainment event including, for example, concerts, shows, cricket, racing, baseball, soccer, basketball, football, hockey, rugby, golf, e-sports, etc. The example method, system, and apparatus may also apply to uniforms and vehicles, where different locations on a uniform or a vehicle are available for sponsorship (where the uniform or vehicle is displayed instead of locations in a venue).

The example method, system, and apparatus disclosed herein are discussed in the context of image-based advertising content for display in one or more electronic scoreboards or video displays of a venue. However, the method, system, and apparatus are configured to enable any type of advertising content to be presented to spectators. For example, the method, system, and apparatus may enable advertisers to provide advertising content in the form of two-dimensional or three-dimensional video or a stream of images, audio, animation, static images, text, print media, etc. Further, the method, system, and apparatus provide for the display or conveyance of advertising content in virtually any space owned or leased by a venue operator, including online space for team-based webpages, advertising space in a team-based application (e.g., an App), advertising space within a team-sponsored email, push notification, or social media post.

Further, the example method, system, and apparatus disclosed herein may be applied to virtually any sponsorship space or venue including museums, airports, transit stations, gas stations, malls, or any where else there are congregations of people and/or a venue operator/team has marketing assets. Moreover, while the disclosure refers to sponsorship space at venues, the example method, system, and apparatus may also provide for management of isolated advertising locations, such as billboards, signs, etc.

The example method, system, and apparatus disclosed herein are described in conjunction with advertising space that is purchased in advance of an event. It should be appreciated that the example method, system, and apparatus may also enable advertising space to be purchased in real-time or near real-time. For example, a spectator may be attending an event and notice, via the disclosed interactive interface for example, that advertising space is available during the event. The example method, system, and apparatus enable the spectator to purchase the advertising space while attending the event. Further, the example method, system, and apparatus enable the spectator to upload advertising content or other content (e.g., an image, a video, a social media post, text, etc.) for display in the purchased advertising space during the event.

Sponsorship System Embodiment

FIG. 1 shows an example sponsorship system 100 that enables venue operators to sell sponsorship opportunities to advertisers, according to an example embodiment of the present disclosure. The system 100 includes a management server 102 that is configured to host one or more systems, algorithms, applications, websites, interactive interfaces, application programming interfaces ("APIs"), etc. that provide for the management of sponsorships. The system 100 also includes a plurality of venue operator servers 104 and 106 that are configured for the management of advertising space within respective venues 108 and 110. The system 100 further comprises advertiser terminals 112 and 114 (e.g., user devices). While FIG. 1 shows two venue operator servers 104 and 106 and two advertiser terminals 112 and 114, the example management server 102 is configured to operate or provide services for tens to hundreds or thousands of venue operators and advertiser terminals.

The example venue operator servers 104 and 106 may include any venue management system. The venue operator servers 104 and 106 connect to the management server 102 via a network 118 (e.g., the Internet and/or a cellular network). As described in more detail below, the venue operator servers 104 and 106 provide venue sponsorship parameters or specification information for selling sponsorship opportunities. The venue operator servers 104 and 106 may include any processor, computer, workstation, laptop computer, smartphone, tablet computer, etc. In some embodiments, the venue operator servers 104 and 106 are communicatively coupled to the respective venues 108 and 110 to transmit one or more messages for the display of advertising or sports-related content. For example, the venue operator servers 104 and 106 may include a scheduling system that enables advertising content (e.g., static images, video, audio, animation, etc.) to be stored in a database in conjunction with an identifier of a date, time, and/or game during which the advertising content is to be displayed. Further, the scheduling system may associate or otherwise relate the advertising content to one or more advertising spaces in the respective venue 108 and 110. The advertising space in the venues 108 and 110 may include video boards such as banner boards, small screens, central scoreboards, jumbotrons, etc. At the specified date, time, and/or game, the scheduling system of respective venues 108 and 110 is configured to cause the advertising content to be displayed at the specified advertising space.

The advertiser terminals 112 and 114 may include any type of device including a smartphone, a cellular phone, a tablet computer, a laptop computer, a workstation, smarteyewear, smartwatch, processor etc. The advertiser terminals 112 and 114 include at least one memory device that stores instructions and at least one processor configured to execute the instructions. Execution of the instructions by the processor of the advertiser terminals 112 and 114 enables the advertiser terminals 112 and 114 to perform the operators described herein.

The advertiser terminals 112 and 114 may include an application 120 (e.g., an App) that is specified by at least some of the instructions that are stored in the memory device. The example application 120 operates in connection with the management server 102 and is configured to display venue sponsorship information provided by the management server 102. Users of the advertiser terminals 112 and 114 use the application 120 to purchase/manage sponsorships with the venue operators 104 and 106. The application 120 may connect to one or more APIs at the management server 102 to provide query requests for advertising space and return query results. The APIs at the management server 102 may also be configured to enable the application 120 to submit advertising content for one or more selected advertising spaces and/or enable the completion of a purchase/reservation of selected advertising space.

In some embodiments, the application 120 may be replaced by a web browser that is configured to access a website hosted or otherwise provided by the management server 102. In these embodiments, third-parties use respective terminals 112 and 114 to access a website of the management server 102. The web browser on the terminals 112 and 114 is used to access the web site for purchasing/managing sponsorship opportunities.

In some examples, as part of purchasing a sponsorship opportunity, third-parties may use the terminals 112 and 114 (or the application 120 on the terminals 112 and 114) to send promotional or advertising content for display in a venue to the management server 102. The management server 102 may be configured to validate the advertising content according to parameters, including parameters or specification information provided by the appropriate venue operator. The parameters or specification information may include a file size parameter, a list of acceptable file types, a minimum and/or maximum image resolution, a minimum and/or maximum color resolution, a range of acceptable pixel dimensions, a range of acceptable image dimensions, content filters, etc.

In some embodiments, the example management server 102 is configured to validate the received advertising content against the parameters or specifications to ensure the content can be displayed at the selected location or advertising space in the venue. For example, a jumbotron display may require a 4K compatible image (e.g., a resolution of 3840×2160 pixels or 4096×2160 pixels) while a banner display only requires a 720 compatible image (e.g., a resolution of 1280×720 pixels). The example management server 102 accordingly ensures the received advertising content is within the parameters or specification provided by a venue operator or manufacturer of a video board. In another example, a filter of the management server 102 may check words or images in the content (using optical character recognition ("OCR") or image analysis as necessary) to ensure the words or images are not graphic or contain inappropriate content for a venue.

In some instances, the management server 102 may modify the received advertising content to conform to the parameters or specification information. For example, content may be provided in a first file format that is not specified as being acceptable or compatible with a venue operator's display system. The management server 102 accordingly converts the file to the appropriate format before sending to the venue operator server 104. In some instances, the management server 102 may provide a preview of the formatted content to the advertiser for acceptance before sending to the venue operator server.

If the content is within the parameters or specification for the selected sponsorship, the management server 102 is configured to transmit the content to the venue operator server 104. In some embodiments, the management server 102 transmits the content (in addition to the display parameters, such as time/date, location) to the venue operator. The venue operator may then load the content into their display or scheduling system for display in the venue 108. In other embodiments, the management server 102 transmits the advertising content (in addition to the display parameters, such as time/date, location) to the venue display or scheduling system of the venue 110. The content may be stored to a database at the venue 110, which is used by the display or scheduling system to determine when/which/where stored advertising content is to be displayed in the venue.

Management Server Embodiment

Figure 2:
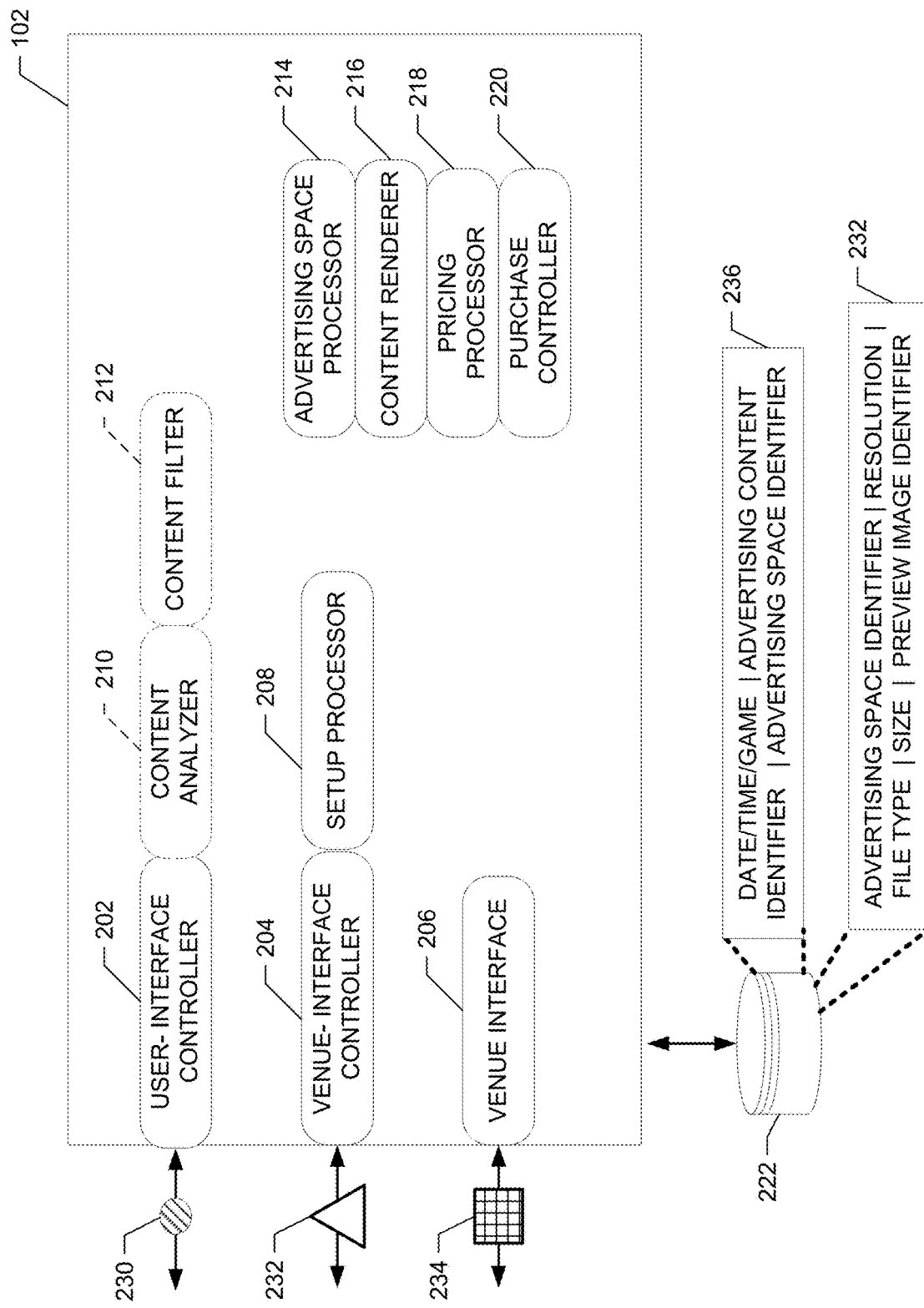
FIG. 2 shows a diagram of the management server of FIG. 1, according to an example embodiment of the present disclosure.

FIG. 2 shows a diagram of the management server 102 of FIG. 1, according to an example embodiment of the present disclosure. FIG. 2 illustrates operational components of the management server 102 including a user-interface controller 202, a venue-interface controller 204, a venue interface 206, a setup processor 208, a content analyzer 210, a content filter 212, an advertising space processor 214, a content renderer 216, a pricing processor 218, and a purchase controller 220. The components 202 to 220 are representative of hardware and/or software of the management server 102. For instance, one or more instructions may be stored to a memory device 222 that define operation of the components 202 to 220. Execution of the instructions by a processor of the management server 102 causes the processor to perform the operations described herein. In some embodiments, at least the content analyzer 210 and/or the content filter 212 may be omitted.

The memory device 222 may include, for example, flash memory, random-access memory ("RAM"), read-only memory ("ROM"), Electrically Erasable Programmable Read-Only Memory ("EEPROM"), etc. The instructions may be part of one or more software programs or applications. In some embodiments, at least some of the instructions may be implemented by hardware components, such as an Application Specific Integrated Circuit ("ASIC").

The example user-interface controller 202 of FIG. 2 is configured to enable advertisers and other users to view, select, and purchase advertising space in one or more venues. The controller 202 may include one or more APIs for receiving search queries and transmitting data for display in the application 120 or on a website via a web browser. As described in more detail below, the controller 202 may provide for the display of available venues with advertising space, available advertising space for a selected venue, and/or pricing/purchasing information related to one or more selected advertising spaces or search queries. The example controller 202 is also configured to receive advertising content 230 from the application 120 or web browser of the terminals 112 and 114. The controller 202 enables a preview of the advertising content 230 within a preview image showing the selected advertising space that is displayed within a webpage or the application 120.

The example venue-interface controller 204 is configured to enable venue operators, via the servers 104 and 106, to specify advertising space available for purchase for one or more venues. The controller 204 may include one or more APIs for receiving search queries and transmitting data for display in the application 120 or on a website via a web browser. The controller 204 is also configured to enable a venue operator to interact with specification or configuration settings for one or more advertising spaces in one or more venues.

FIG. 2 shows that the memory device 222 may include a database or other data structure that stores specification information 232 provided by venue operators via one of the servers 104 and 106. As described below in more detail, the specification information 232 may identify advertising space within a venue and provide details that are useful for purchasing the space. The specification information 232 includes for each advertising space for a venue, for example, an identifier of the advertising space and an identifier of a preview image or content for the advertising space. The identifier may link or otherwise be related to an image (e.g., a preview image) or other content that shows the advertising space in a venue. The specification information 232 may also include a date, time, and/or game that the advertising space is available, a price (or dynamic pricing) of the advertising space for each date, time, and/or game that it is available, a minimum purchase requirement associated with the advertising space, a restocking threshold for the advertising space, and parameters for advertising content for the advertising space. The parameters may include, for example, a file type, a minimum and/or maximum file size, a minimum and/or maximum resolution, pixel dimensions, image dimensions, and/or a location, boundary, or area of the advertising space within the preview image.

The example setup processor 208 is configured to guide an advertiser through a setup of an advertising space for a venue. In some examples, the setup processor 208 analyzes the specification information 232 to determine if any of the information or parameters are outside of specified thresholds. The setup processor 208 may also determine if any fields of the application 120 or a webpage are blank that require population by a venue operator. As described in more detail below, the example setup processor 208 is also configured to enable a venue operator to specify a location in a preview image for an advertising space to enable advertising content provided by advertisers to be rendered in the preview image.

The venue interface 206 is configured to communicatively couple with a scheduling system of the venue operator servers 104 and 106. The venue interface 206 is configured to transmit one or more messages 234 that include advertising content for display in an advertising space. The messages 234 may include order information 236 that is provided by an advertiser and stored in a data structure of the memory device 222. As described in more detail below, the order information 236 includes a date, time, and/or game for which advertising space has been purchased. The order information 236 also includes the advertising content (or an identifier of the advertising content) and/or an identifier of the advertising space. In some embodiments, the order information may also include information indicative of price paid, whether the purchase is associated with a campaign or bulk purchase, and/or information indicative of the purchasing advertiser. As discussed above, the servers 104 and 106 are configured to add the advertising content to a scheduling system for display at the requested advertising space for the specified date, time, and/or game.

In some embodiments, the venue interface 206 may receive feedback data from the venue operator server 104 and 106. The feedback data may include a confirmation that the advertising content was displayed at the requested advertising space for the specified date, time, and/or game. In some instances, the feedback data may include an image or a video of the advertising content displayed at the requested advertising space. The feedback data may also include venue information for the day, time, and/or game, such as attendance, estimated views, or any feedback provided by venue staff or spectators. The venue interface 206 is configured to store the feedback data to the memory device 222 in relation with a related entry for the advertising space. This enables the management server 102 to display the feedback data to a purchaser to confirm the advertising content was displayed at the requested advertising space for the specified date, time, and/or game.

As discussed above, the user-interface controller 202 of the management server 102 is configured to receive advertising content 230 from advertisers for display in advertising space. The advertising space processor 214 and the content renderer 216 are configured to enable the advertising content to be virtually displayed in a preview image on the terminals 112 and 114. This virtual visualization enables an advertiser to assess how advertising content will appear in advertising space before committing to a purchase of the space. The user-interface controller 202 is configured to enable an advertiser to upload different advertising content until a selection is made. For example, an advertiser may try different resolutions of an image for display in an advertising space until the desired quality/appearance is achieved.

In some embodiments, the content analyzer 210 may analyze the advertising content to ensure it meets specified specification information. For example, the content analyzer 210 may compare a file type of received advertising content to a list of approved file types. If a file type does not match, the content analyzer 210 may be configured to convert the file to an approved file type. Further, the content analyzer 210 may compare a file size of the advertising content to a minimum and/or maximum file size provided in the specification information 232 of the corresponding advertising space. Moreover, the content analyzer 210 may compare a resolution of the advertising content to a minimum and/or maximum resolution provided in the specification information 232 of the corresponding advertising space. Additionally, the content analyzer 210 may compare pixel dimensions or image dimensions of the advertising content to a minimum and/or maximum pixel dimensions or image dimensions provided in the specification information 232 of the corresponding advertising space. If the advertising content is within the specification information 232, the content analyzer 210 enables the advertising content to be further processed. However, if the advertising content is not within the specification information 232, the content analyzer 210 is configured to cause the user-interface controller 202 to provide an error message at the appropriate terminal 112 and 114. The error message may identify which specification was not met, such as the image resolution of the advertising content not meeting a minimum requirement.

The example content filter 212 of the management server 202 of FIG. 2 is configured to screen or otherwise compare advertising content to a database of banned content. The banned content may include depictions or descriptions of nudity, violence, profanity, negative words or phrases, racial words or phrases, racial images, or words, phrases, or images related to adult products. The banned content may also include certain products, such as alcohol, marijuana, or e-cigarettes.

The example content filter 212 is configured to determine if at least a portion of the advertising content matches at least some of the banned content. In some examples, the content filter 212 may use one or more OCR algorithms and/or image recognition algorithms to identify a composition of the advertising content. For example, the content filter 212 may perform text recognition and compare the recognized text to a list of text within the banned content. Additionally or alternatively, the content filter 212 may perform template matching or other image analysis to identify items, such as nipples, penises, fire arms, etc. In some embodiments, venue operators may provide a list of banned content. Further, the venue operators may differentiate the list of banned content based on an event at the venue. For example, the list may be greater for concerts aimed at children compared to an adult-orientated concert.

If the content filter 212 determines at least a portion of the advertising content matches at least some of the banned content, the content filter 212 causes the user-interface controller 202 to display an error message on the appropriate terminal 112 and 114. The error may identify the source of the issue, such as "Image Cannot Contain Nudity". If the content filter 212 determines that the advertising content does not match at least some of the banned content, the content filter 212 enables the advertising content to be further processed.

The example advertising space processor 214 is configured to provide for an advertiser to purchase advertising space. The advertising space processor 214 is configured to process data from advertisers provided via the user-interface controller 202 to complete a form or other data structure for reserving and/or purchasing advertising space. The advertising space processor 214 is also configured to operate with the content renderer 216 to cause advertising content to be displayed in a preview image of the advertising space. This includes changing a size, shape, resolution, angle, and/or orientation of advertising content to fit within a designated area of the advertising space shown within the preview image. The advertising space processor 214 causes the user-interface controller 202 to display the rendered advertising content in the preview image in conjunction with other purchase information. The advertising space processor 214 may also create a data structure entry with the order information 236 for each advertising space purchased by an advertiser.

The example purchase controller 220 is configured to operate with the advertising space processor 214 to enable an advertiser to complete the purchase or reservation of one or more advertising spaces. The purchasing controller 220 may provide for the bundling of multiple advertising spaces for the same or different dates, times, and/or games. Moreover, the purchasing controller 220 may provide for an advertiser to purchase advertising space across multiple venues and/or for different types of sports. The purchasing controller 220 may group the batch purchases into one or more campaigns for the advertiser for tracking purposes. The purchasing controller 220 may operate with the user-interface controller 202 to accept and process payment information from an advertiser.

In some embodiments, the management server 102 is configured to enable a venue operator to specify dynamic pricing. The example pricing processor 218 is configured to manage the pricing for advertising space. In an example, the a venue operator may specify, via the user-interface controller 202, a percent increase for a certain advertising space as available quantity is purchased for a particular date, time, game or remaining dates, times, and/or games. For example, the venue-interface controller 204 may provide for an interactive interface that enables a venue operator to specify that for each unit of a certain advertising space below 5 remaining units, the price is to increase by 25%. The example pricing processor 218 is configured to track the conditions for dynamic pricing such that the price shown to an advertiser via the user-interface controller 202 is accurate. In other instances, a venue operator may specify a dynamic pricing model based on opposing team record, opposing team, and/or weekend games. The example pricing processor 218 is configured to determine which conditions within the model are met and apply the appropriate pricing.

Venue Operator Interface Embodiments

Figure 3:
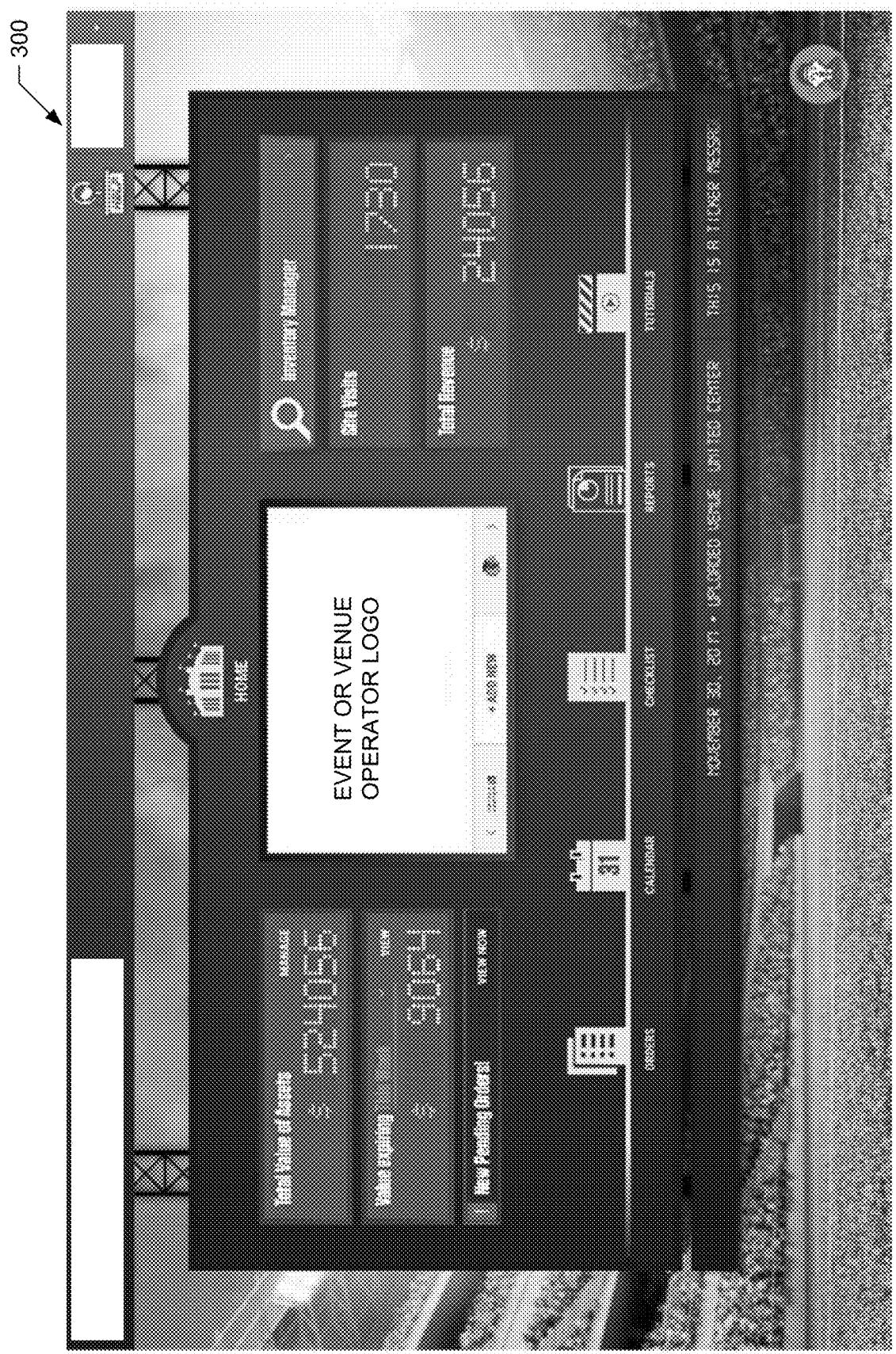
FIG. 3 shows a diagram of a dashboard user interface for venue operators, according to an example embodiment of the present disclosure.
Figure 12:
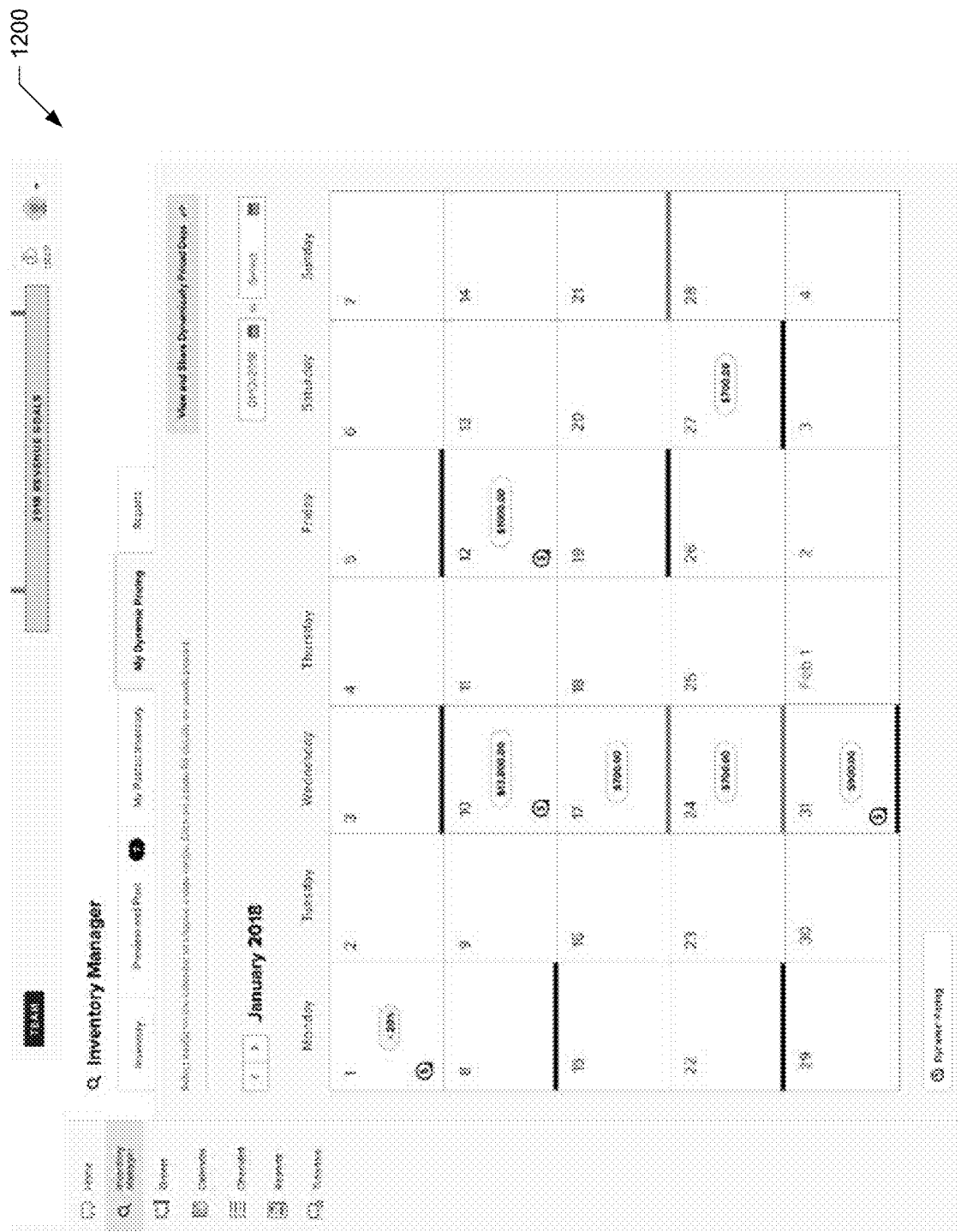
FIGS. 12 and 13 show diagrams of user interfaces of a calendar that illustrates posted advertising space for a venue and which of the days are subject to dynamic pricing, according to example embodiments of the present disclosure.
Figure 13:
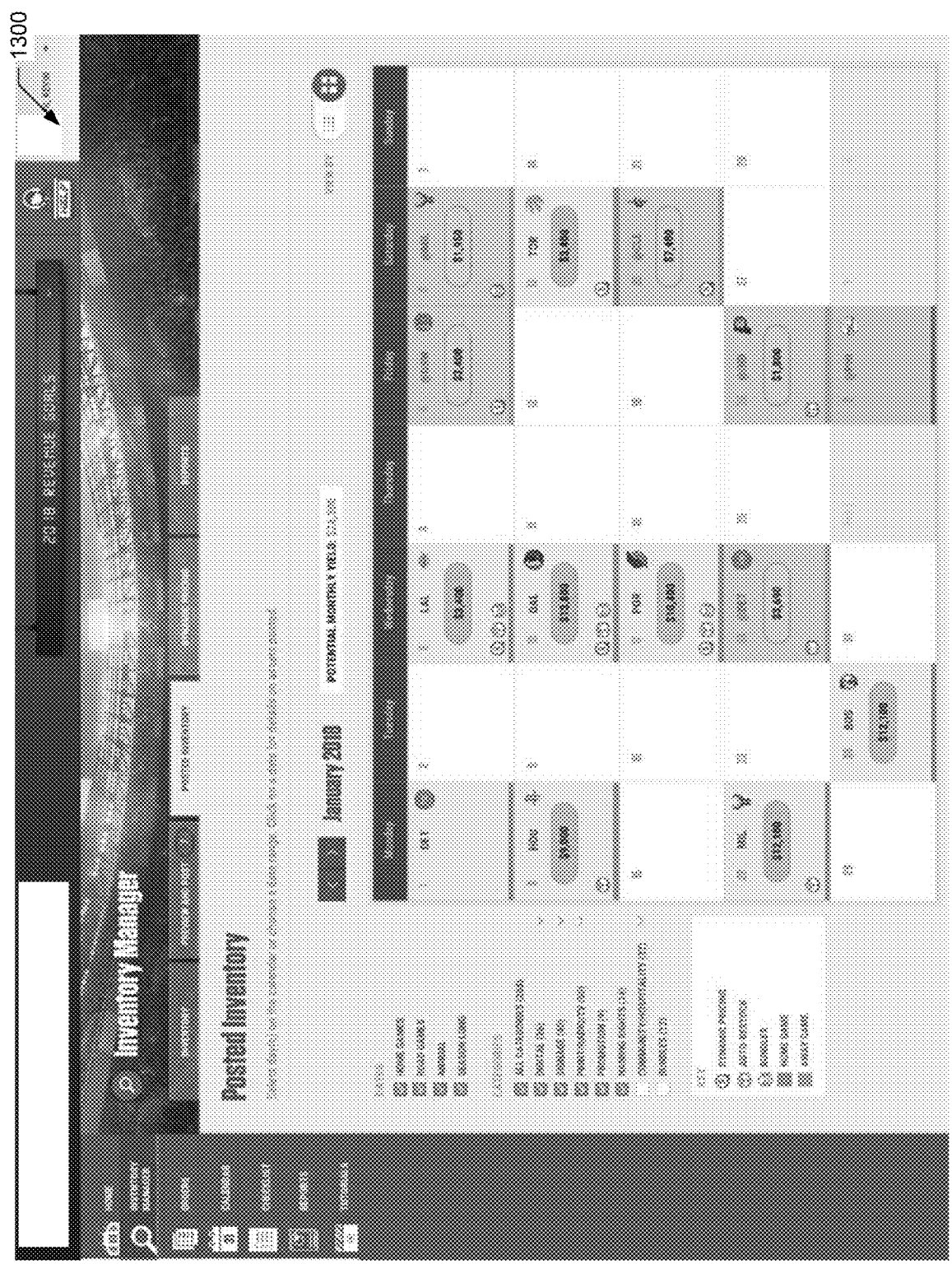

FIGS. 3 and 13 show user interfaces provided by the application 120 and/or the venue-interface controller 204 of FIG. 2 to enable a venue operator to specify advertising space for purchase, according to example embodiments of the present disclosure. The user interfaces may also operate in conjunction with the setup processor 208 of FIG. 2. The displayed interfaces of FIGS. 3 to 13 may also enable a venue operator to manage/track purchases of sponsorships or advertising space. Together, the user interfaces of FIGS. 3 to 13 prompt venue operators for specification information for advertising spaces of venues.

The user interface 300 of FIG. 3 shows a diagram of a navigation or dashboard screen with icons that link to different features provided by the management server 102. The features include an inventory manager to view available and purchased advertisement inventory. The inventory may be filtered/ordered by location in a venue, date, event, etc. The user interface 300 also includes features for tracking completed and in-process orders, calendar of events, checklist or required parameters/specification information for sponsorships, reports regarding sponsorships, and tutorials. The user interface 300 also includes information regarding site visits tracked by the management server 102 and total revenue generated through the platform hosted by the management server 102. The management server 102 may also determine a value of expiring adverting space that is available for purchase for an upcoming week and/or month.

The example user interface 300 also enables a venue operator to select different venues under common management. For example, a venue operator may own five different venues across the country. The example user interface 300 enables the operator to change the information displayed for a selected venue. In some instances, the management server 102 enables an operator to bundle sponsorships across multiple venues and provide the appropriate tracking.

Figure 5:
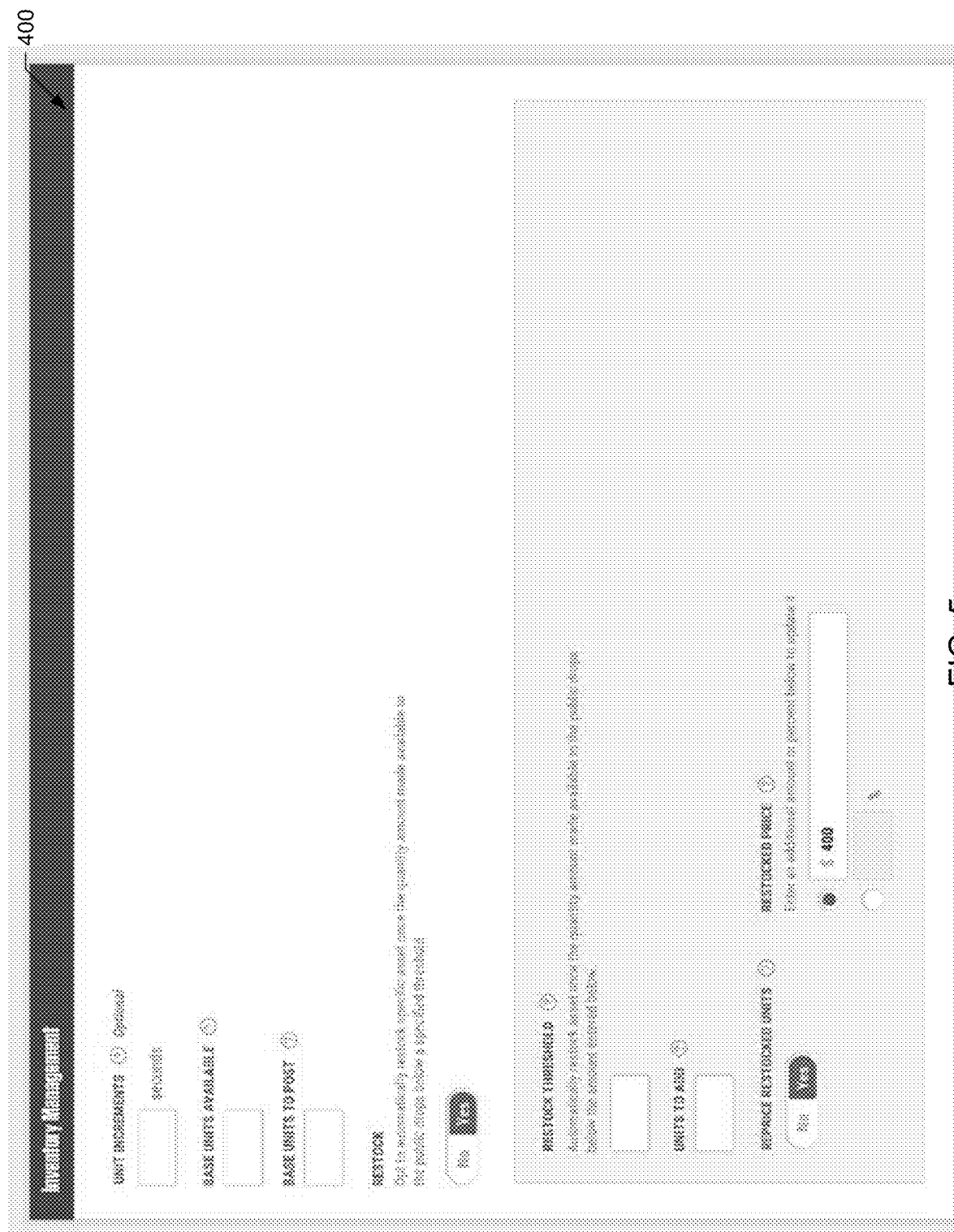
Figure 6:
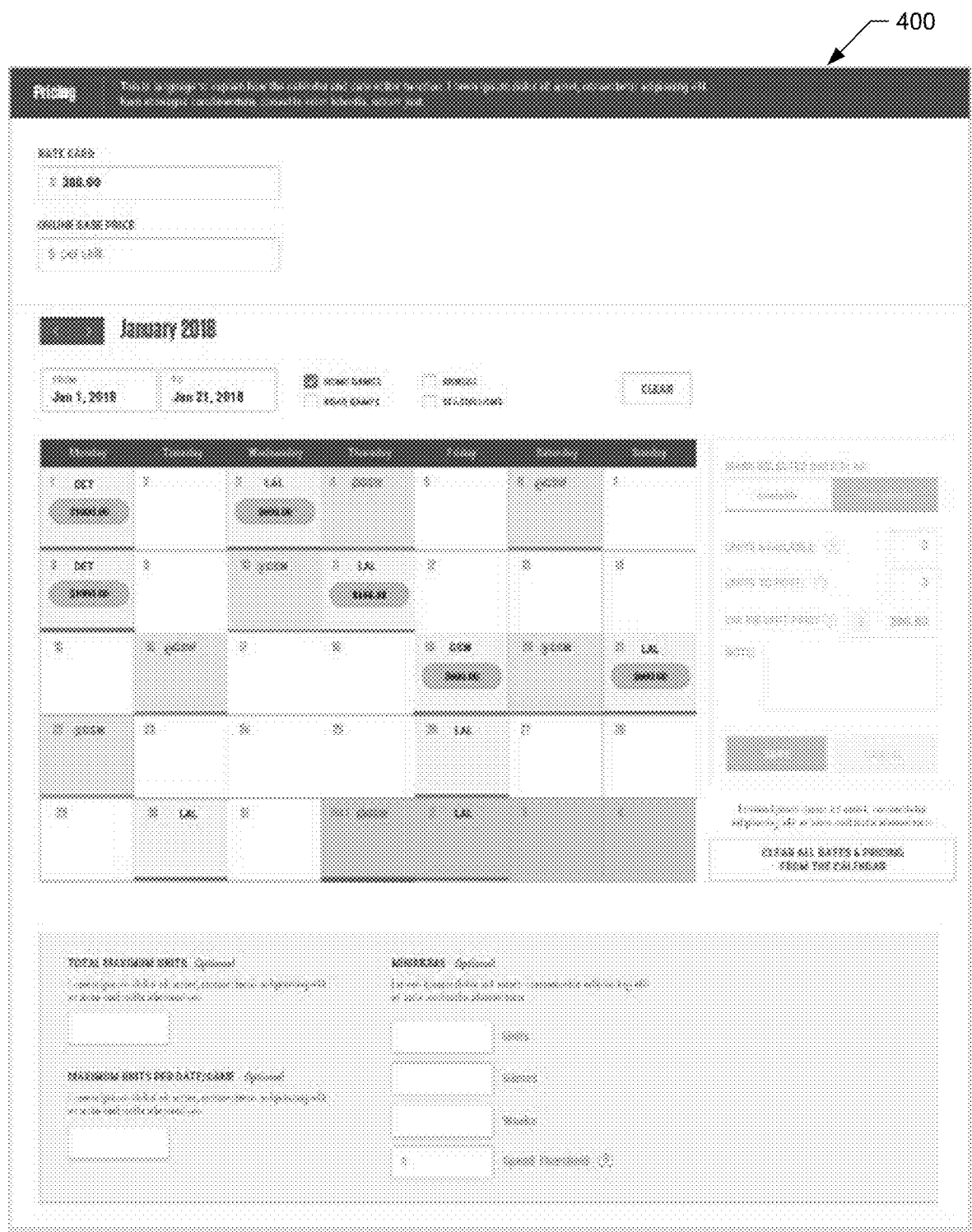
Figure 7:
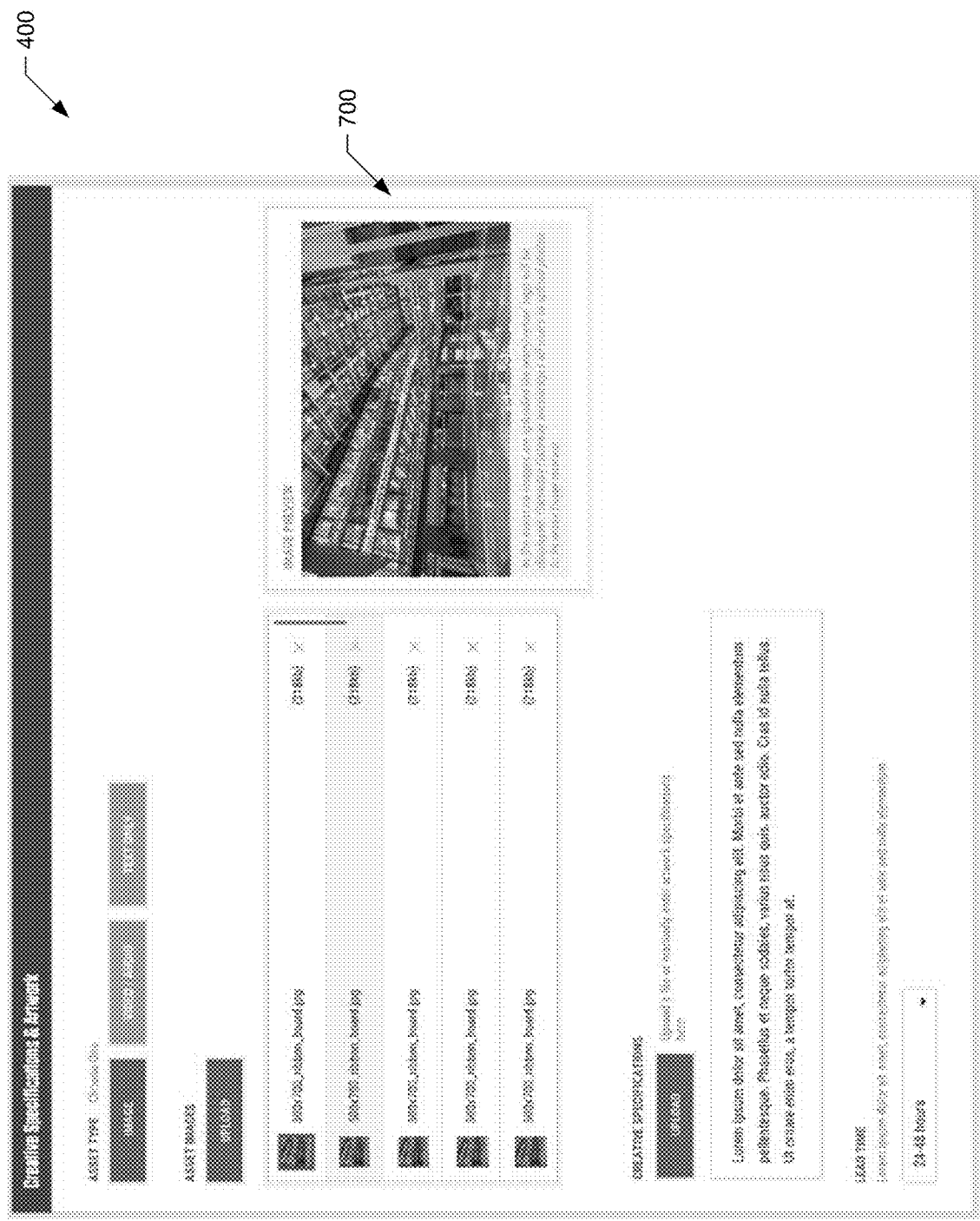

The example user interface 400 of FIGS. 4 to 7 includes fields that enable a venue operator to select or define parameters or specification information for a specific sponsorship. In this example, the user interface 400 shows information for defining parameters for ribbon boards at the United Center® in Chicago, Illinois. As shown in FIG. 7, the user interface 400 includes one or more graphical pictures (e.g., preview picture 700) and/or interactive maps of the advertising space.

Figure 4:
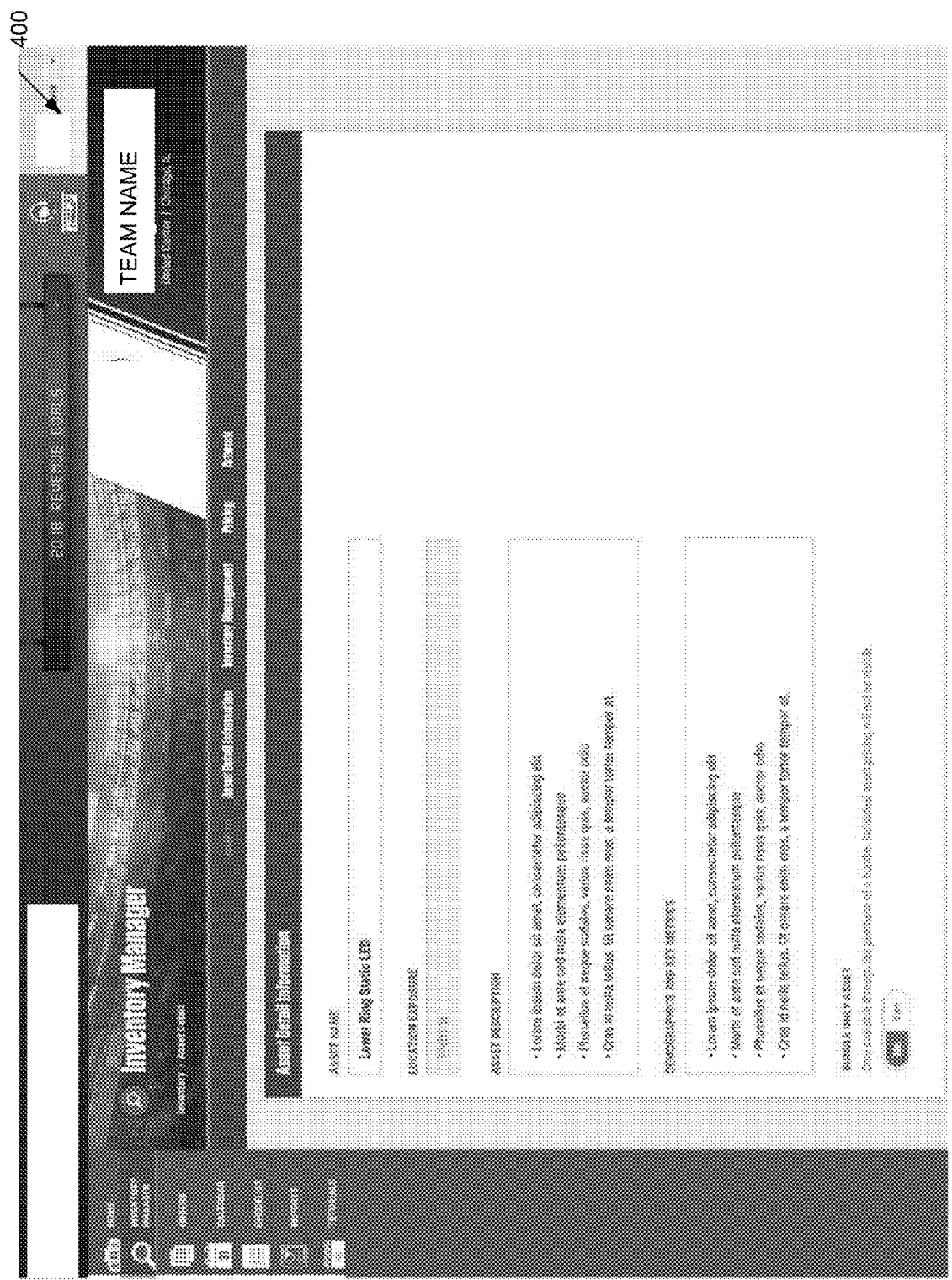
FIGS. 4 to 7 show diagrams of user interfaces that enable venue operators to provide specification information for advertising space or assets, according to an example embodiment of the present disclosure.

The example user interface 400 of FIG. 4 includes fields for a description of the advertising or sponsorship space, which may include parameters and/or specification information for advertising content. The user interface 400 of FIG. 4 further includes fields for location exposure in the venue, lead time for ordering, and a button to indicate whether the advertising space is to be included within a bundle of other advertising spaces. Selection of the bundle button causes the user interface 400 to display a list of bundles for selection or enable a venue operator to create a new bundle.

Figure 8:
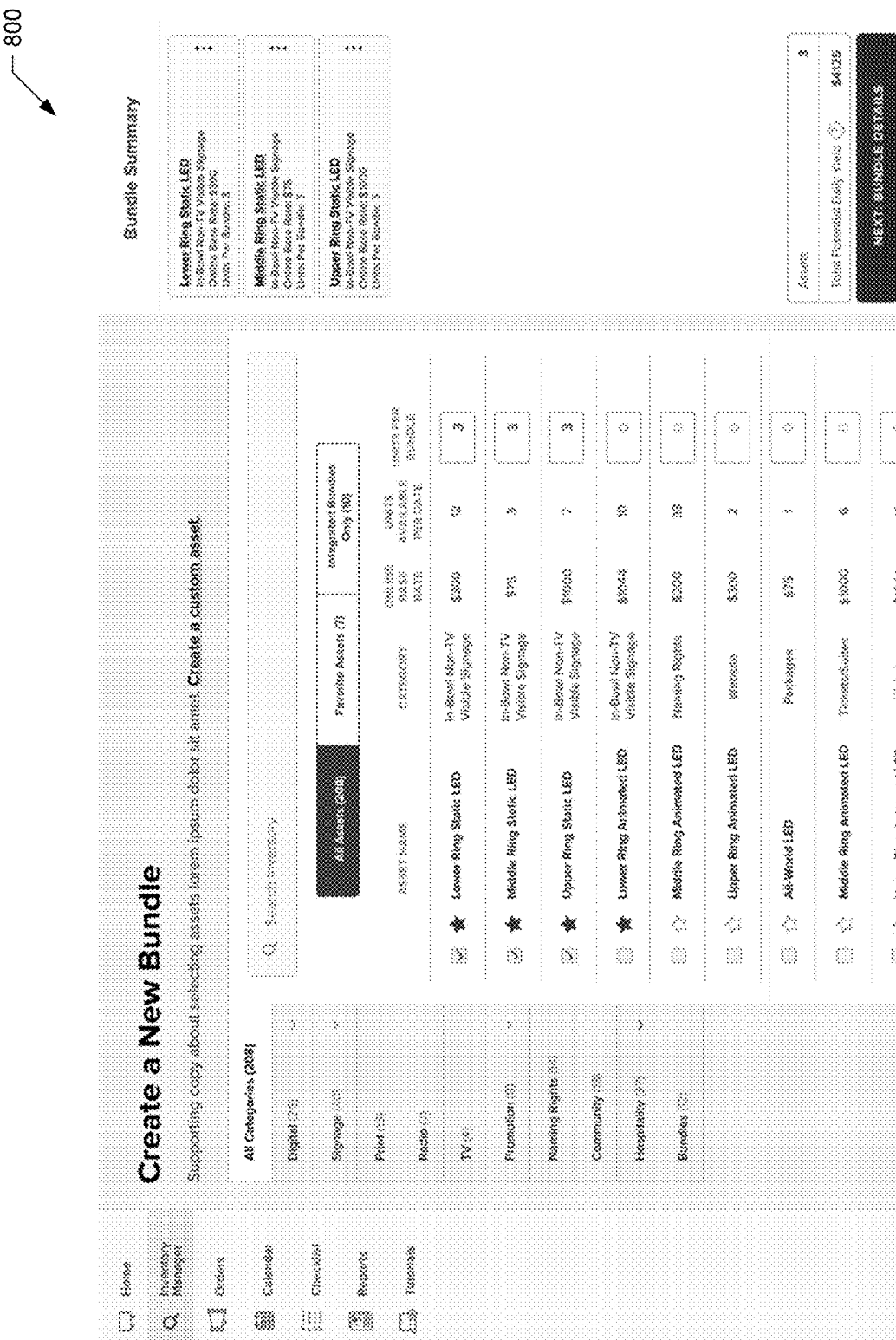
FIG. 8 shows a diagram of a user interface that enables venue operators to create a bundle of advertising spaces, according to an example embodiment of the present disclosure.

FIG. 8 shows a diagram of a user interface 800 that may operate in conjunction with the venue-interface controller 204 to enable a venue operator to create a bundle of advertising spaces. In the illustrated example, a venue operator selects which advertising spaces or assets of a venue are to be included within a bundle. The user interface 800 also includes fields that enable a venue operator to select a number of units of the advertising space for the bundle, where a unit may correspond to a particular date, time, and/or game and/or type of advertising space. A summary section of the user interface 800 shows which advertising spaces have been selected and a potential daily price for the bundle. The user interface 800 is configured to enable a venue operator to enter a different price for the bundle compared to a sum of the individual spaces.

Returning to the user interface 400, FIG. 5 shows that the interface may include fields for inventory management. For each advertising space or asset, a venue operator can specify a number of base units available per game or season, a number of base units to post, and restocking options. Selection of a restocking option enables a venue operator to select dynamic pricing such that the restocked units have a different price.

The user interface 400 of FIG. 6 shows available dates, times, and/or games for an advertising space. The venue operator may use the interface 400 to enter the dates, times, and/or games in which an advertising space is available for purchase. In other examples, the management server 102 may analyze a team schedule to populate the available dates, times, and/or games. The user interface 400 also includes fields that enable a venue operator to specify maximum and/or minimum purchases for a game and/or season for the particular advertising space.

Returning to FIG. 7, the user interface 400 enables a venue operator to upload a preview image 700 of the advertising space. The user interface 400 also includes a feature to enable a venue operator to specify if the advertising space is capable of displaying only a static image, video/audio, and/or text only. Selection of the asset type changes which specification information is needed by the management server 102. The user interface 400 of FIG. 7 also includes fields for a venue operator to specify parameters for specification information for the advertising space. As shown in the user interface 400 of FIG. 9, the parameters can include a file type, a minimum and/or maximum file size, a minimum and/or maximum resolution, pixel dimensions, image dimensions, and/or a location, boundary, or area of the advertising space within the preview image.

Figure 10:
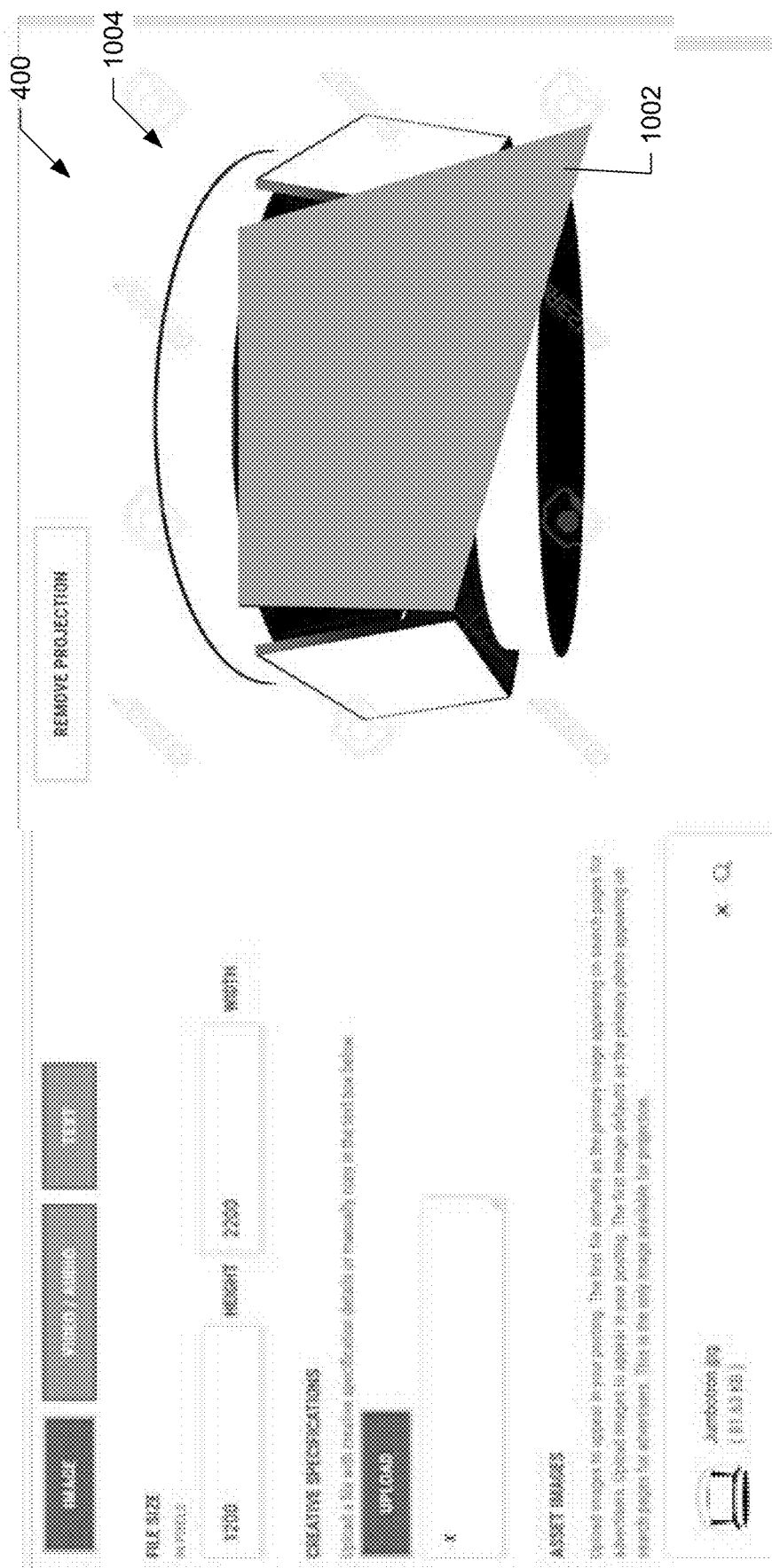
FIGS. 10 and 11 show diagrams of a user interface that enables venue operators to specify a location of advertising space within a preview image, according to example embodiments of the present disclosure.

In some examples, the user interface 400 in conjunction with the setup processor 208 is configured to enable a venue operator to specify a location of advertising space within a preview image. FIG. 10 shows a diagram illustrative of the user interface 400 that enables a venue operator to specify a location of advertising space 1002 within a preview image 1004. In the illustrated example, the preview image 1004 includes an image of a center scoreboard for a venue. The setup processor 208 may assign coordinates or other location information for the preview image 1004.

The user interface 400 in conjunction with the setup processor 208 enables a venue operator to specify a location of the advertising space 1002. For example, the user interface 400 enables a venue operator to specify corners or edges of the advertising space 1002 by selecting portions of the preview image 1004 and/or drawing lines on the preview image 1004. The user interface 400 may display the advertising space 1002 as a blank screen, a greyed-out area, a blacked-out area, and/or a graphic indicative of space parameters relative to the preview image 1004. As shown, the user interface 400 is configured to enable a user to change or drag edges or borders of the advertising space 1002, shown as a highlighted area. After placement, a venue operator causes the management server 102 to store the location of the advertising space 1002 relative to the preview image 1004.

In some embodiments, the user interface 400 may enable a venue operator to specify more than one location for a certain advertising space. In the illustrated example, the venue operator may also draw advertising space for the adjacent display screens such that any advertising content is displayed on the three display screens at the same time. In other examples, one or both of the other display screens may be designated as separate advertising space.

Figure 11:
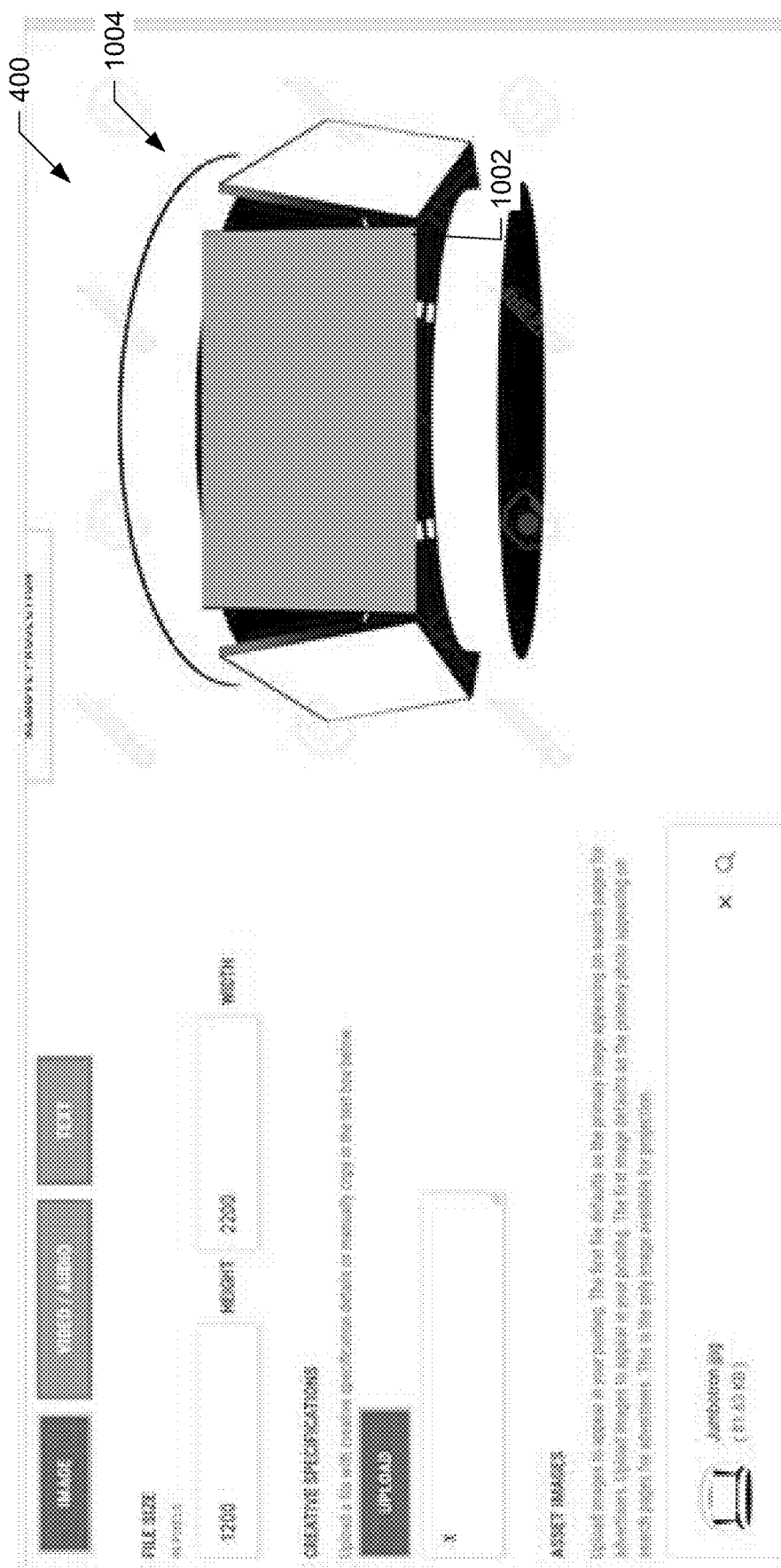

FIG. 11 shows the advertising space 1002 further adjusted by the venue operator via the user interface 400 to fit within a border of the advertising space provided in the preview image 1004. In this example, the venue operator moved a lower-right corner of the advertising space 1002 to a corner of the advertising space that is shown in the preview image 1004, thereby properly setting a location of the advertising space 1002 relative to the preview image 1004.

The specification of the advertising space 1002 relative to the preview image 1004 designates an area of the preview image 1004 that is to display advertising content received from an advertiser to provide a virtual representation. In some embodiments, the setup processor 208 may associate a file viewer or media player with the advertising space 1002. For example, the setup processor 208 may specify that a viewing or display area of a media player is to show advertising content at the location specified by the advertising space 1002. In other examples, the setup processor 208 may specify that the specified advertising space 1002 in the preview image 1004 corresponds to a location for an image file that is uploaded by an advertiser via a specified user interface, discussed in more detail below.

FIGS. 12 and 13 show respective user interfaces that are configured to enable a venue operator to specify dynamic pricing for certain dates, times, and/or games. In the illustrated example, FIG. 12 shows a user interface 1200 with dates in which dynamic pricing has been implemented are indicated by a "$" icon. Further, FIG. 13 shows a user interface 1300 in which dates in which dynamic pricing has been implemented. Such dates are include a "$" icon. A selection of the dynamic pricing in the user interfaces 1200 or 1300 causes the pricing processor 218 in conjunction with the venue-interface controller 204 to provide one or more different pricing models for selection or modification by a venue operator. For example, the pricing processor 218 may provide a graphical workflow interface that enables a venue operator to select the variables or inputs for dynamic pricing, such as weather, team records/trends, playoff implication games, team location, etc. The pricing processor 218 may also enable a venue operator to select weights for the different inputs, such as visiting team, record of home and/or visiting team, estimated ticket sales, or day of a game. The pricing processor 218 may further determine dynamic pricing based on, for example, available inventory, a record of the home team for the venue, a record of the away team visiting the venue, winning/losing trends and/or playoff implications of home/away teams, bulk purchases, etc. As such, the example pricing processor 218 provides automation of price setting, thereby maximizing a venue's advertising/promotional revenue while reducing the need for extensive sales departments and resellers.

Figure 14:
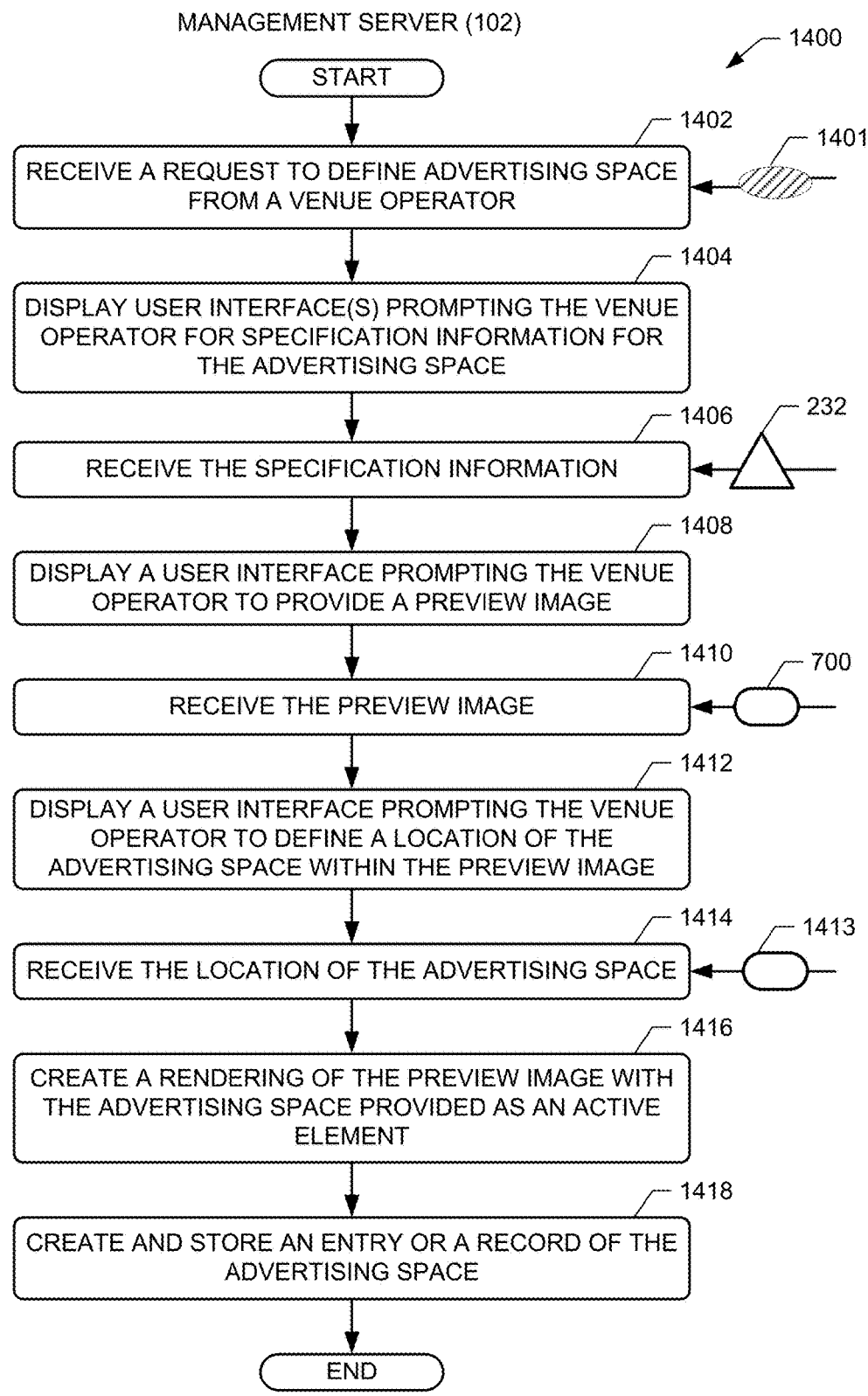
FIG. 14 shows a diagram of an example procedure for specifying advertising space in a venue for purchase, according to an example embodiment of the present disclosure.
Figure 15:
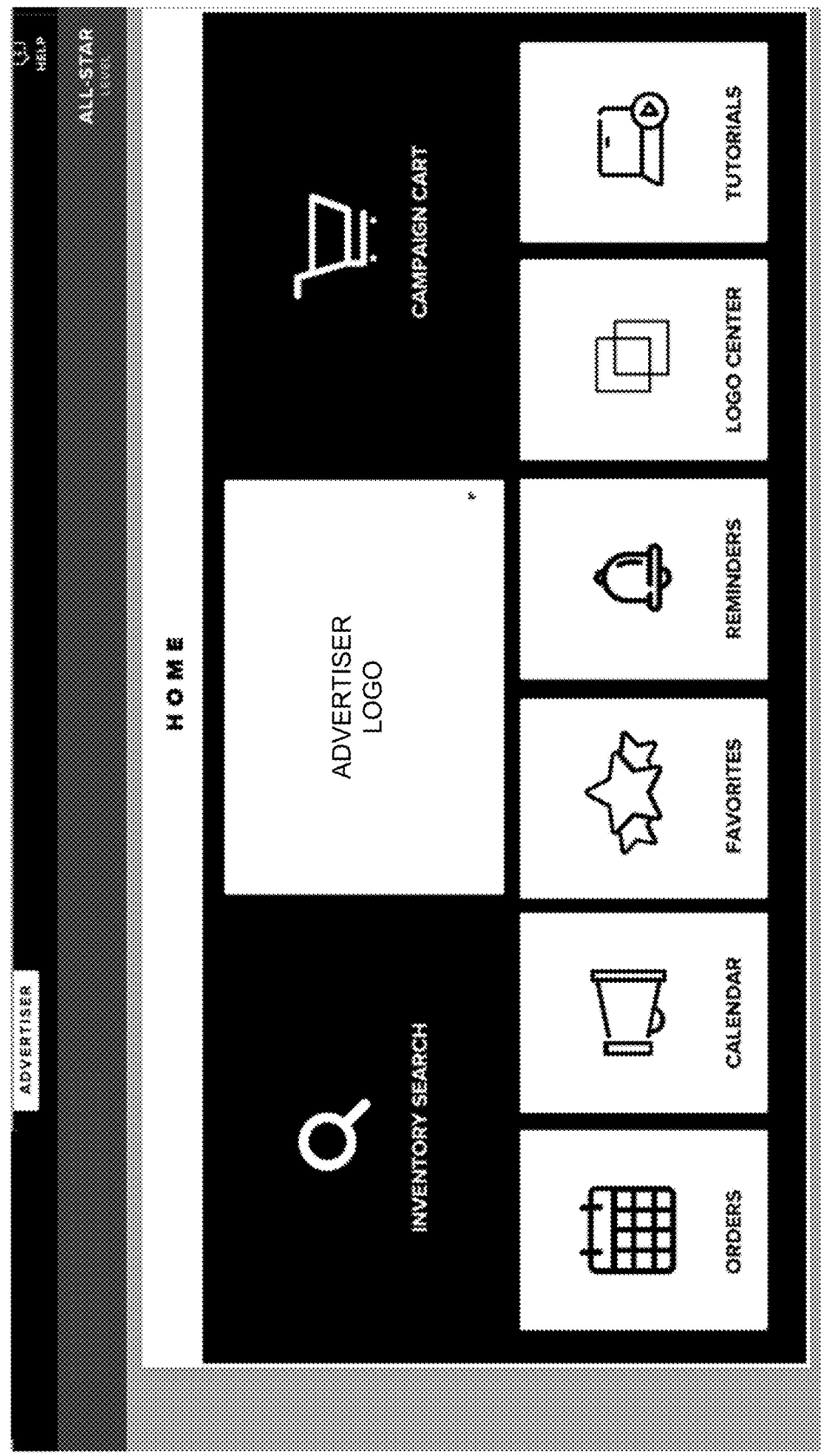
FIG. 15 shows a diagram of a dashboard user interface for advertisers or purchasers, according to an example embodiment of the present disclosure.

FIG. 14 shows a diagram of an example procedure 1400 for specifying advertising space in a venue for purchase, according to an example embodiment of the present disclosure. Although the procedure 1400 is described with reference to the flow diagram illustrated in FIG. 14, it should be appreciated that many other methods of performing the steps associated with the procedure 1400 may be used. For example, the order of many of the blocks may be changed, certain blocks may be combined with other blocks, and many of the blocks described are optional. Further, the actions or steps described in procedure 1400 may be performed among multiple devices including, for example the management server 102, the advertiser terminals 112 and 114, the venue operator servers 104 and 106, and/or the application 120 of FIG. 2.

The example procedure 1400 begins when the management server 102 receives, from a venue operator server 104 or 106, a message 1401 for a request to define or otherwise specify advertising space for a venue (block 1401). The message 1401 may include a selection of a dashboard user interface to launch the user interface 400 of FIGS. 4 to 7 via the application 120 or a webpage. After receiving the message 1401, the management server 102 causes the server 104 or 106 to display one or more user interfaces 400 having fields that prompt the venue operator for specification information for the advertising space (block 1404). The management server 102 then receives the specification information 232 in one or more messages from the server 104 or 106 (block 1406). As described above, the specification information 232 includes a purchase price, dates, times, and/or games in which the advertising space is available for purchase, a number of units of the advertising space located throughout a venue or area, restocking instructions, dynamic pricing information, description information, minimum/maximum purchase amounts, etc. The specification information 232 may also include information indicative as to whether the advertising space is part of a bundled asset.

Figure 9:
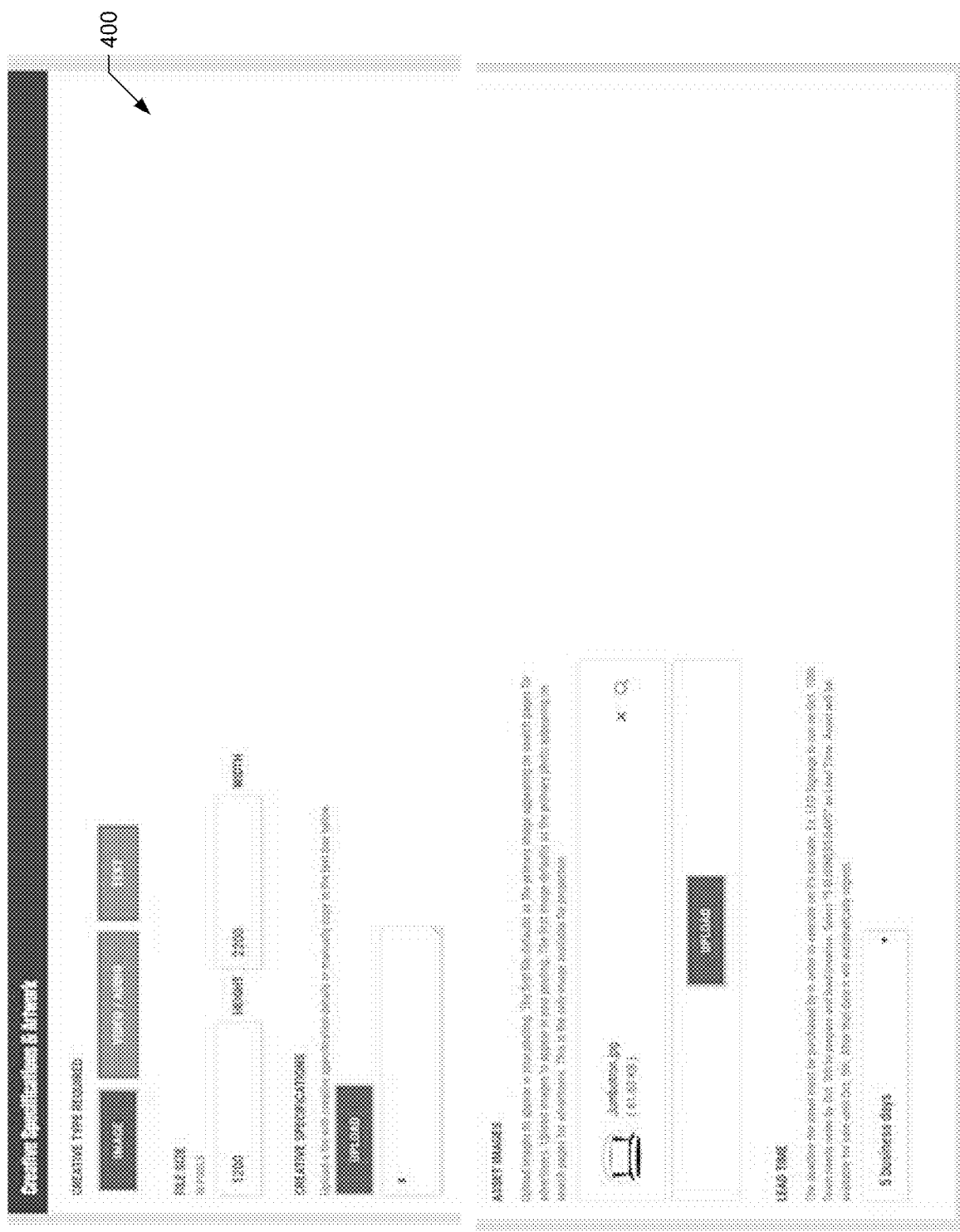
FIG. 9 shows a diagram of a user interface that enables venue operators to specify parameters for advertising content for a designated advertising space or asset, according to an example embodiment of the present disclosure.

The management server 102 also displays a prompt via the user interface (as shown in FIGS. 7 and 9) for a preview image for the advertising space (block 1408). The management server 102 next receives one or more messages from the venue operator server 104 or 106 containing a file for a preview image 700 (block 1410). In some embodiments, the management server 102 may confirm the preview image is within thresholds for resolution, file type, etc. before performing further processing with the preview image.

The management server 102 next causes a user interface to be displayed with the preview image with text and fields for prompting the venue operator to define or otherwise specify a location of the advertising space within the preview image (block 1412). The user interface may also include text and/or fields to enable the venue operator to specify content parameters for the advertising space, such as supported file type(s), maximum/minimum resolution, maximum/minimum file size, maximum/minimum image or pixel dimensions etc. As described in connection with FIGS. 10 and 11, the management server 102 may provide one or more graphical tools that enable the venue operator to draw or otherwise specify corners, edges, boundaries, or an area for the advertising space relative to the preview image. This includes, for example, enabling a venue operator via the user interface 400 to draw a polygon over the preview image. The management server 102 may also apply a coordinate plane or grid to the preview image. The management server 102 receives coordinates or other location information 1413 from the server 104 or 106 of the specified location of the advertising space relative to the preview image (block 1414). Using the specified location, the management server 102 creates a rendering of the preview image such that the advertising space is provided or otherwise defined as an active element. Further, the management server 102 may cause the advertising space to the shown as a blank section in the preview image when it is displayed to advertisers before advertising content is uploaded. In some instances, the management server 102 may associate the active element, including its location on the preview image, with a media player or an image display program, applet, plugin. Further, the management server 102 may link or otherwise create a relationship between the active element and an upload field for advertising content. The link or relationship specifies that a file uploaded to the management server for the advertising content is to be displayed or otherwise played in the active element for the advertising space that is shown in the preview image.

In some embodiments, the management server 102 may instead automatically define the location of the advertising space without input, or at least initial input, from the venue operator. For example, the management server 102 may use pixel or image analysis on a preview image to identify blank video boards and other structure that resembles advertising space. The management server 102 then applies the advertising space active element to the identified location. In some instances, the management server 102 may cause the server 104 and 106 to prompt the venue operator as to whether the determined location for the advertising space is correct relative to the preview image. If the placement is not correct, the management server 102 enables the venue operator to change a location of the advertising space, as discussed above.

Returning to FIG. 14, after the advertising space is defined for a preview image, the management server 102 receives an indication from the venue operator server 104 or 106 that the specification of the advertising space is complete. The management server 102 accordingly creates and stores to the memory device 222 a record or a data structure entry for the advertising space (block 1418). This includes storing the preview image and the active element for the advertising space with the preview image. After an entry for the advertising space has been stored, the example procedure 1400 ends. In some embodiments, the procedure 1400 may continue for the venue operator for the specification of other advertising spaces in the same venue or different venues.

Advertiser (Business) Purchaser Interface Embodiments

FIGS. 15 to 26 show user interfaces that enable an advertiser or other purchaser via the terminal 112 or 114 to purchase sponsorship or advertising space, according to example embodiments of the present disclosure. The user interface 1500 of FIG. 15 includes a dashboard or navigation screen of available features provided by the management server 102 and/or the application 120 to a purchaser. The features include an inventory search for advertising space, current orders, favorite advertising space or venues, a calendar of events, reminders, logo center, tutorials, and a campaign cart. Selection of the features causes the application 120 and/or the management server 102 to display one or more related user interfaces.

Figure 16:
FIG. 16 shows a diagram of a user interface that includes fields that enable advertisers to search for advertising space in one or more venues, according to an example embodiment of the present disclosure.
Figure 17:
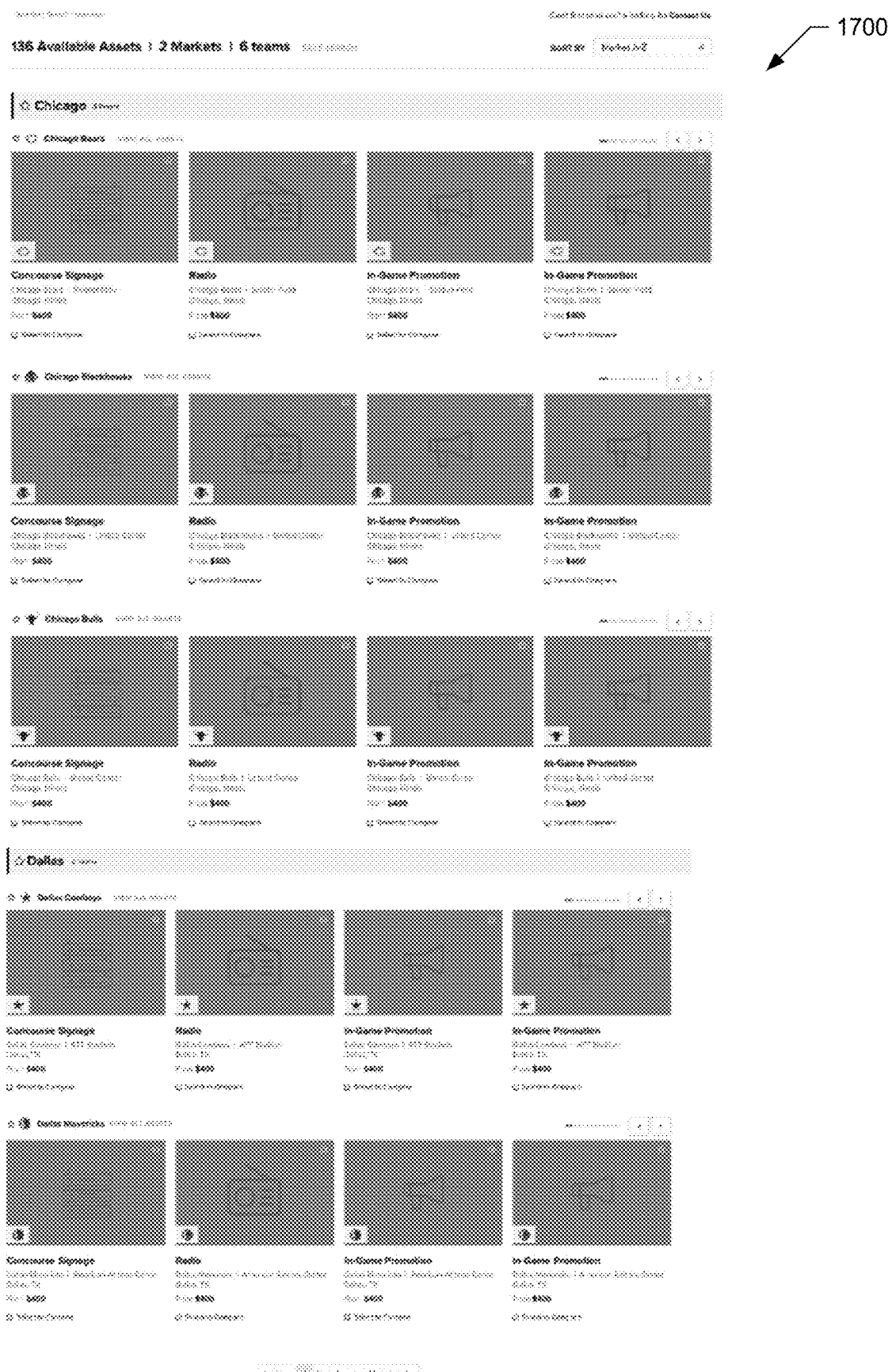
Figure 18:
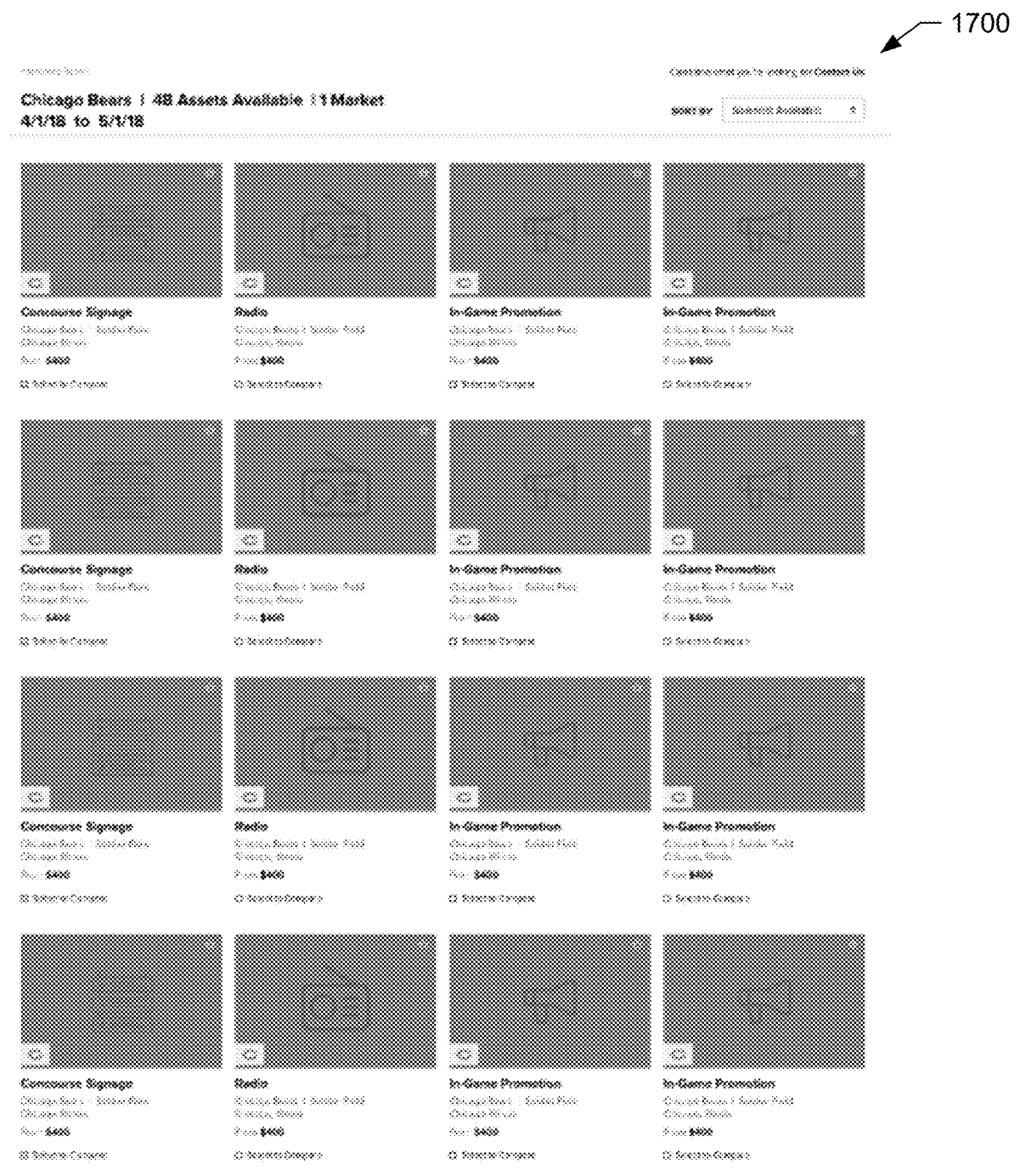

FIG. 16 shows a diagram of a user interface 1600 that includes fields that enable an advertiser to search for advertising space. The user interface 1600 may be displayed by the application 120 on the terminals 112 and 114 and/or within a web browser of a website. The user-interface controller 202 of the management server 102 is configured to receive user inputs related to the user interface 1600 and cause the advertising space processor 214 to perform the appropriate searches by accessing the advertising space entries stored in the memory 222. The user-interface controller 202 is also configured to return the search results. FIGS. 17 and 18 show diagrams of a search result user interface 1700 that displays advertising space that matches search criteria entered into one or more fields of the user interface 1600 of FIG. 16.

The example user interface 1600 includes fields that enable an advertiser or purchaser to search across different markets, leagues, teams, venues, asset advertisement type, dates, location exposure, budget, and/or category. The user interface 1600 provides text configured to prompt a purchaser to select and search for multiple assets at one time, such as different markets, sports leagues, teams, asset names, dates, etc. The user interface 1600 also enables a purchaser to filter inventory based on certain desired dates or sponsorships available for a fill or partial season. Selection of a category provides different types of sponsorships. For example, in addition to video and static boards, venues may provide sponsorships for their websites, non-game events (offseason festivals), social media accounts, and/or email/text messages.

In instances where a purchaser desires to search inventory by arena or venue, the example management server 102 or the application 120 may provide a graphical illustration or interactive map of the venue. The available sponsorship locations may be highlighted by an icon on the venue map. Selection of an icon causes the management server 102 to display more information about the asset or advertising space.

FIG. 17 shows search results that are displayed in the user interface 1700 based on a search query for the Chicago and Dallas markets. The user interface 1700 includes a summary of the search criteria provided at the user interface 1600 in addition to additional fields for further filtering/searching. Selection of an asset or advertising space causes the management server 102 and/or the application 120 to display an information and purchase user interface (e.g., user interface 1900 of FIG. 19) that is related to the selected asset.

FIG. 18 shows search results that are displayed in the user interface 1800 based on a search query for the Chicago Bears® professional football team. It should be appreciated that more targeted searches will return fewer assets, such as searches by day, time, and/or game. Further, in some instances, a venue operator may specify that a top row of the search results should feature featured advertising space.

Figure 19:
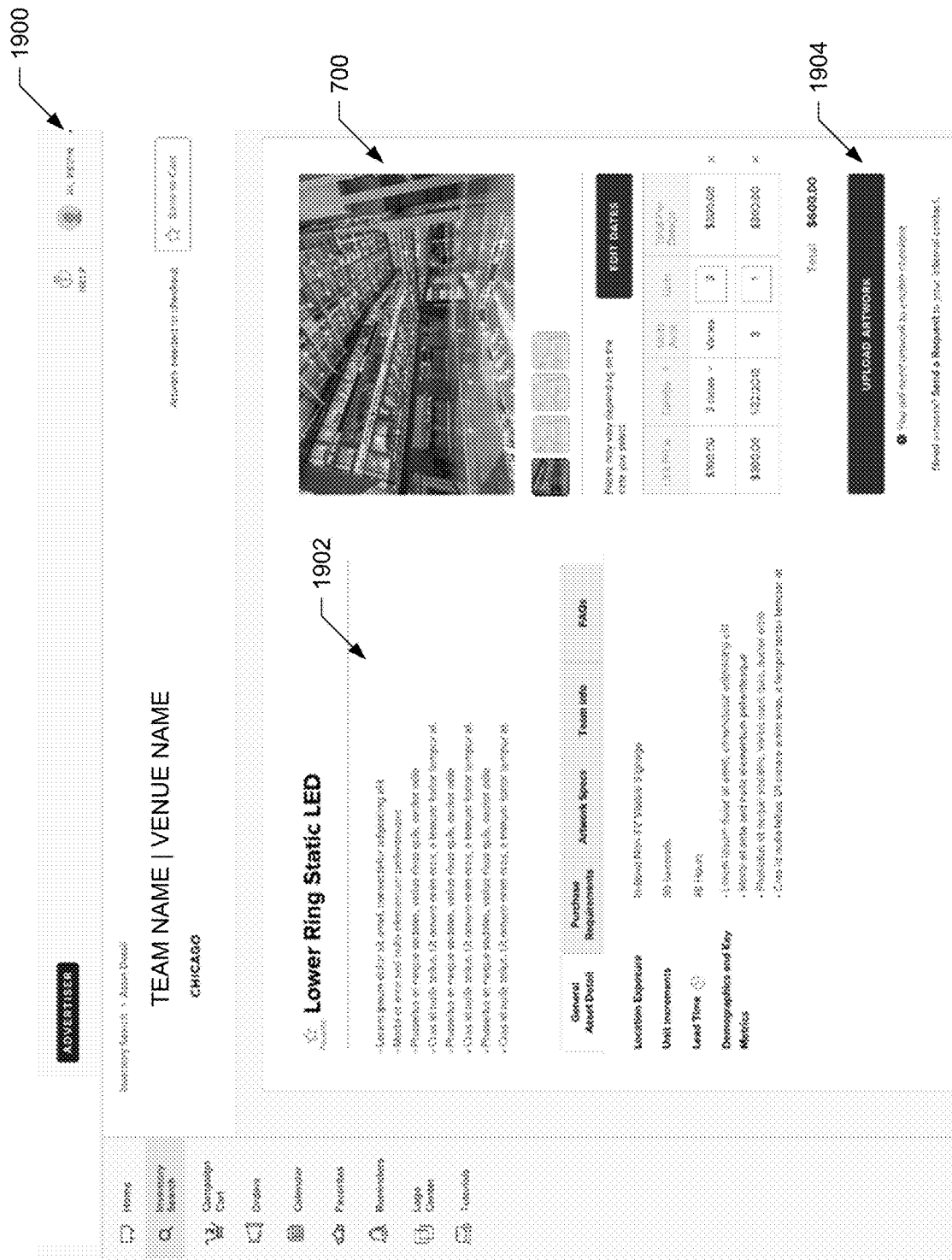
FIG. 19 shows a diagram of a user interface that shows specification information for a selected advertising space or asset to advertisers, according to an example embodiment of the present disclosure.
Figure 20:
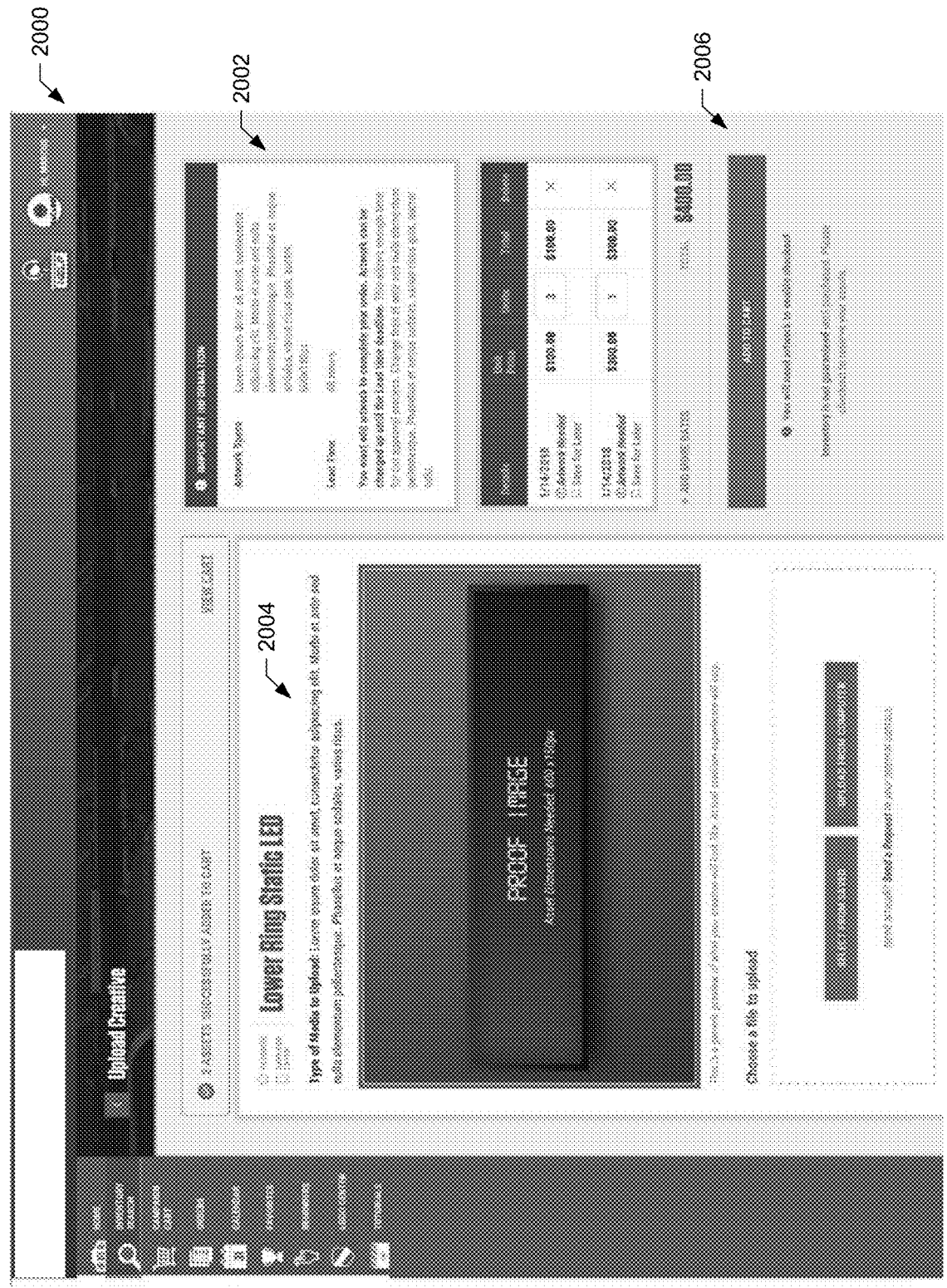
FIG. 20 shows a diagram of a user interface that enables advertisers to upload or otherwise specify advertising content for selected advertising space, according to an example embodiment of the present disclosure.
Figure 21:
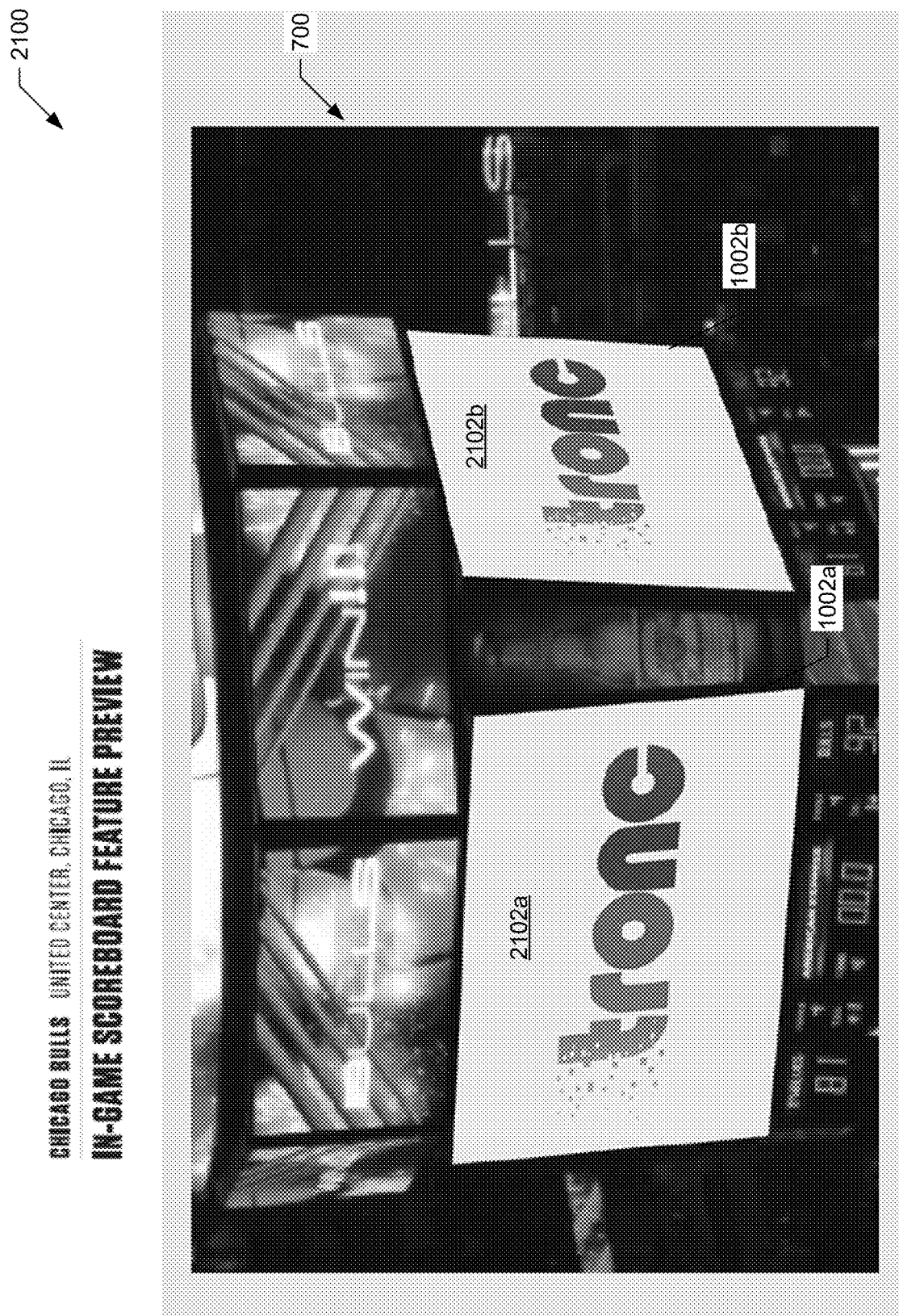
FIG. 21 shows a diagram of a user interface that displays a preview image including advertising content that is shown within two advertising spaces, according to an example embodiment of the present disclosure.

The user interface 1900 of FIG. 19 (e.g., an upload interactive user interface) shows information for a selected advertising space or asset. The specification information shown in the user interface 1900 is accessed from the corresponding advertising space entry in the memory 222. Further, as discussed above in connection with FIGS. 4 to 7, the specification information shown in the user interface 1900 is provided by a venue operator. The user interface 1900 includes a section 1902 that includes a description of the selected advertising space. The section 1902 may also display information about exposure, demographics, purchase lead time, purchase requirements, advertising content parameters or specifications, team information, and answers to typical questions. The user interface 1900 also includes the preview image 700 provided by the venue operator. As discussed above, the selected advertising space is shown as a blank or greyed-out section in the preview image 700. In other examples, the preview image 700 may include generic or example advertising content. Further, the user interface 1900 may be configured to have multiple preview images of the same advertising space to provide perspectives from different distances, angles, and/or locations in a venue. In some examples, the user interface 1900 may also include a map or an interactive map that shows a location of the advertising space within a venue.

The example user interface 1904 also includes an upload section 1904. The example upload section 1904 prompts an advertiser to provide advertising content for the selected advertising space. Selection of the 'Upload Artwork" icon in the user interface 1900 causes the management server 102 and/or the application 120 to display a content user interface 2000, shown in FIG. 20. The example content user interface 2000 is configured to enable an advertiser or purchaser to upload or otherwise specify advertising content for the selected advertising space.

The example user interface 2000 includes a parameter section 2002 that specifies content parameters, such as supported file types, acceptable file sizes, acceptable resolutions, acceptable pixel dimensions, and/or acceptable image dimensions. The parameter section 2002 may also provide a list of banned content and/or a video length threshold. The user interface 2000 also includes a content section 2004. The example content section 2004 includes text that prompts an advertiser to upload or otherwise provide advertising content. The content section 2004 also includes a preview of the uploaded advertising content. The user interface 2000 also includes a cart section 2006. The example cart section enables a purchaser to add the advertising space to a cart for purchase after the advertising content has been uploaded and determined to be acceptable.

In some embodiments, the user interface 2000 is configured to enable an advertiser or user to upload multiple content items for storage. The advertiser may then access the memory device 222 containing the stored items to select which content is to be displayed in a selected asset or advertising space. The user interface 2000 may also b configured to enable an advertiser to organize stored content by different criteria such as, for example, job, customer, brand, team, campaign, etc.

As discussed above in connection with FIG. 2, the content analyzer 210 and/or the content filter 212 may analyze the advertising content to ensure it conforms to specified parameters. For example, the content filter 212 may search a composition of the advertising content for matches to banned content. Further, the content analyzer 210 may compare a file type, size, image/video resolution, and/or image/video size to parameters specified for the selected advertising space. If the advertising content is acceptable, the management server 102 renders the content for display or otherwise enables the content to be stored to an order entry 236 if the advertiser adds it to a card or otherwise purchases it.

In some embodiments, the application 120 and/or the management server 102 is configured to provide a virtual visualization or rendering of the advertising content in a preview image. The preview image may be displayed in the content section 2004 of the user interface 2000. Additionally or alternatively, the preview image may be displayed in a separate user interface, such as user interface 2100 shown in FIG. 21. The user interface 2100 includes the preview image 700 and the advertising content 2102a and 2102b shown within respective advertising spaces 1002a and 1002b that are provided in the preview image. The user interface 2100 renders the advertising content 2102 in a manner that approximates how the content is to be displayed in the selected asset or advertising space 1002. This may include display an image, playing a video, playing sound, and/or providing an animation. In other words, the user interface 2100 provides a virtual visualization of the advertising content 2102a and 2102b for the corresponding advertising space 1002 within a venue.

As discussed above in connection with FIG. 2, the content renderer 216 is configured to use the parameters and/or specification information for the advertising space 1002 to format the image. This includes using the location information of the advertising space 1002 relative to the preview image 700. In an example, the content renderer 216 is configured to scale the received advertising content to a size of the advertising space 1002, then move the scales image to the location specified for the advertising space 1002 relative to the preview image 700. This may also include the renderer 216 adding scaled content to an image viewer application or media player, where the display area is specified as a display area of an active element of the preview image 700. In addition to scaling, the content renderer 216 may also perform file conversion to a preferred file format, resolution scaling to match an acceptable or specified resolution, and/or angle or otherwise orient the content. For instance, the advertising space 1002b is shown at an angle within the preview image 700. The content renderer 216 is configured to change dimensions and an orientation of the content such that it fits within the advertising space 1002b at the appropriate angle. In some embodiments, the orientation may be defined by the venue operator by drawing a perimeter around designed areas during specification, as discussed in connection with FIGS. 10 and 11. Based on dimensions and angle of lines for the advertising space 1002, the content renderer 216 orientates and re-sizes the content within the advertising space 1002 accordingly. For video and animations, the content renderer 216 processes each image in sequence so the video/animation is properly aligned in the appropriate area of the preview image 700.

Figure 22:
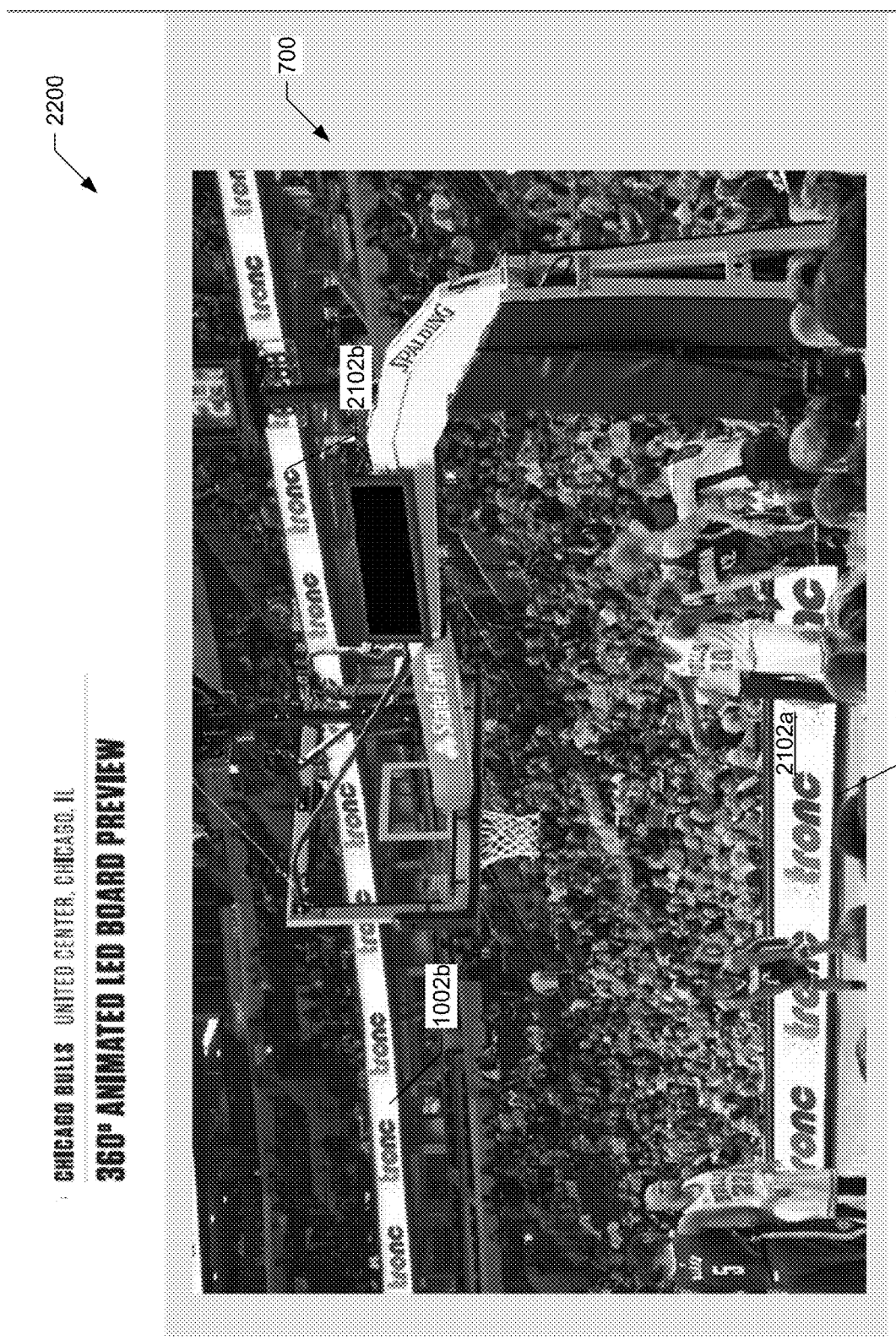
FIG. 22 shows a diagram of a user interface that displays a preview image with advertising spaces shown as banner boards, according to an example embodiment of the present disclosure.

FIG. 22 shows another user interface 2200 that displays a preview image 700 with advertising spaces 1002a and 1002b shown as banner boards. In this example, the content renderer 216 of the management server 102 renders advertising content within the elongated and curved advertising space 1002. Further, the content renderer 216 creates multiple instances of the advertising content 2102 to show it repeating in the banner boards. The content renderer 216 may create multiple instances when the received content cannot be spread out across the entire board in a single instance. In other examples, an advertiser may provide a single image, video, or animation that is formatted for display throughout the entire banner board. In some instances, the content renderer 216 may show how the advertising content moves along the banner board over time based on the corresponding active element. In the example of multiple instances, the active element of the preview image 700 may define positions for each instance of the advertising content as well as how each instance moves overtime. In the example of a single instance, the entire banner board comprises an active element for video or animation display.

Figure 23:
FIGS. 23 and 24 show diagrams of a user interface displaying a preview image before and after an advertiser uploads advertising content to the management server of FIG. 2, according to an example embodiment of the present disclosure.
Figure 24:
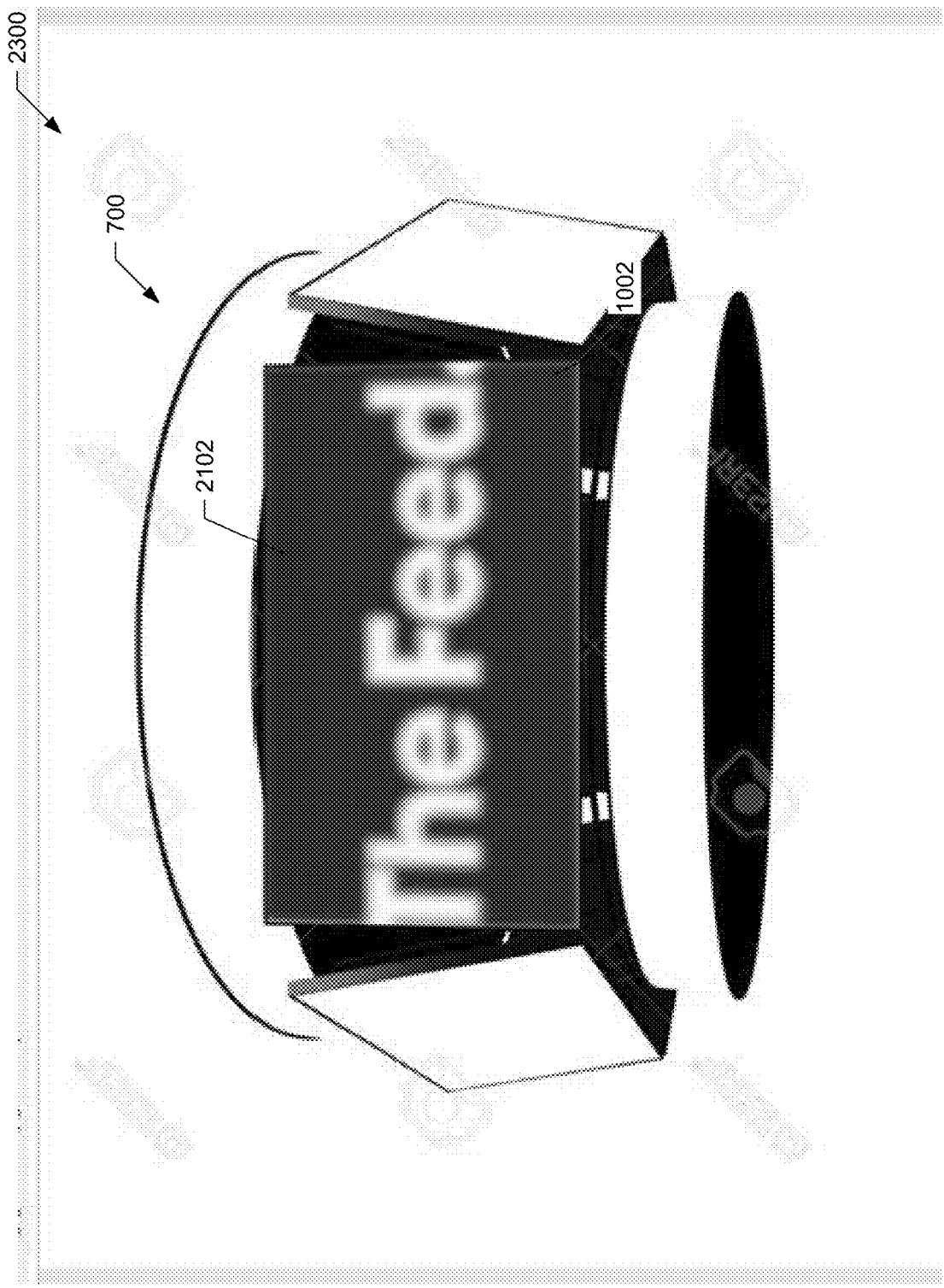

FIG. 23 shows a diagram of a user interface 2300 for displaying a preview image 700, according to another example embodiment of the present disclosure. The preview image 700 includes an image of an advertising space 1002 in which a display area is provided as a blank section. In other embodiments, the display area of the advertising space may show generic advertising content or an example of past advertising content. FIG. 24 shows a diagram of the user interface 2300 after an advertiser has uploaded advertising content 2102 to the management server 102. As discussed above, the management server 102 causes the advertising content 2102 to be rendered within the advertising space 1002 of the preview image 700. In the illustrated example, the advertiser may determine that the advertising content appears blurry in the preview image 700 and select different advertising content with better resolution.

Figure 25:
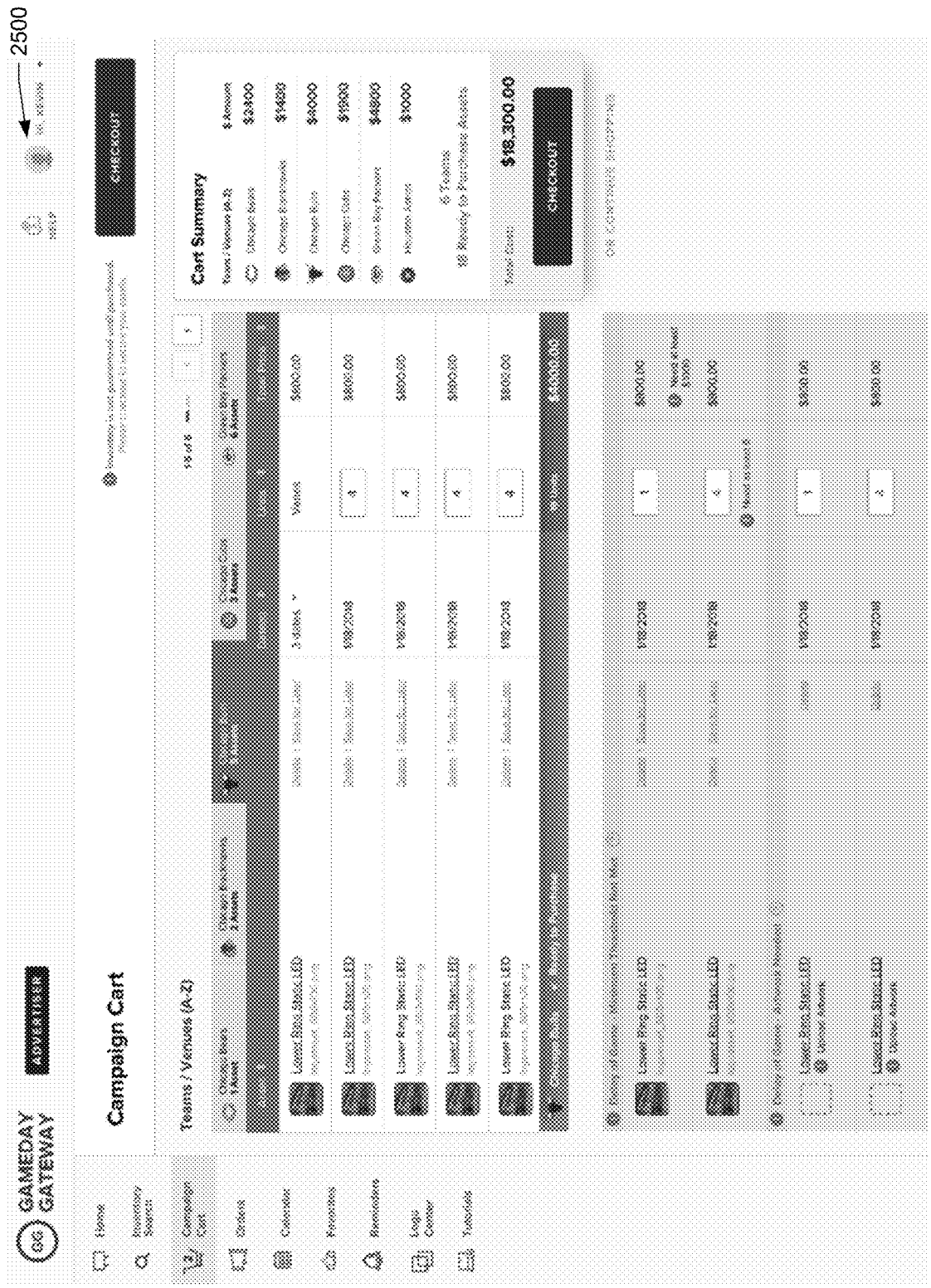
FIG. 25 shows a diagram of a user interface for purchasing advertising spaces for a campaign, according to an example embodiment of the present disclosure.

In addition to enabling advertising purchasers to purchase sponsorship assets, the management server 102 may also provide campaign management features. FIG. 25 shows a diagram of a user interface 2500 for purchasing advertising spaces for a campaign. The assets or advertising spaces may be grouped in the user interface 2500 by date/time/event, venue, market, etc. In some examples, the management server 102 may provide an interactive map of a venue that displays approximate times when purchased assets will be displayed. This may include providing a time-elapsed simulation of an event showing when/where the provided advertising content will be shown. For example, the server 102 may show a simulation where a first advertisement is displayed in a first location during the first quarter of a game and a second advertisement displayed in a second location during the fourth quarter of the game. In some instances, the management server 102 may replace a venue map with a geographic map of different venues/locations and show a time elapse of advertisements that are displayed. The example user interface 2500 may also provide a price paid for each asset or advertising space as well as a total price.

The example management server 102 may also be configured to compare assets or advertising space that is selected for purchase with minimum purchase requirements set by a venue operator. If a threshold is not met, the management server 102 is configured to prevent the assets or advertising space from being purchased (as shown in the 'Delay of Game') section of the user interface 2500. The management server 102 may provide an indication of why the threshold has not been met, such as advertising content (e.g., artwork) not being provided or a minimum quantity of dates/times/assets or price not being purchased.

In some embodiments, the example management server 102 may display a user interface that provides verification information indicative that advertising content was displayed at the specified date, time, and/or game. For example, when advertising content is displayed on a purchased asset, a venue operator records an image of the display. The venue operator uploads the recorded image to the server 104 or 106, which transmits the image to the management server 102. The example management server then associates the image with the purchased asset or advertising space. In some examples, the image may include metadata or other identifier corresponding to the advertising space and/or a date/time/game the image was recorded. The advertiser (business) purchaser may view the image via the user interface to confirm their advertisement content was displayed as desired. In some examples, cameras at preset locations periodically record images of the sponsorship space (or are triggered at each change of content). The recorded images are sent to the management server 102 with a time/date stamp. The management server 102 may also receive a schedule from a venue regarding a time at which advertising content was displayed, or at least an approximate sequence. The management server 102 is configured to process this information to automatically associate the verification image with the purchased advertising content for the advertiser.

Figure 26:
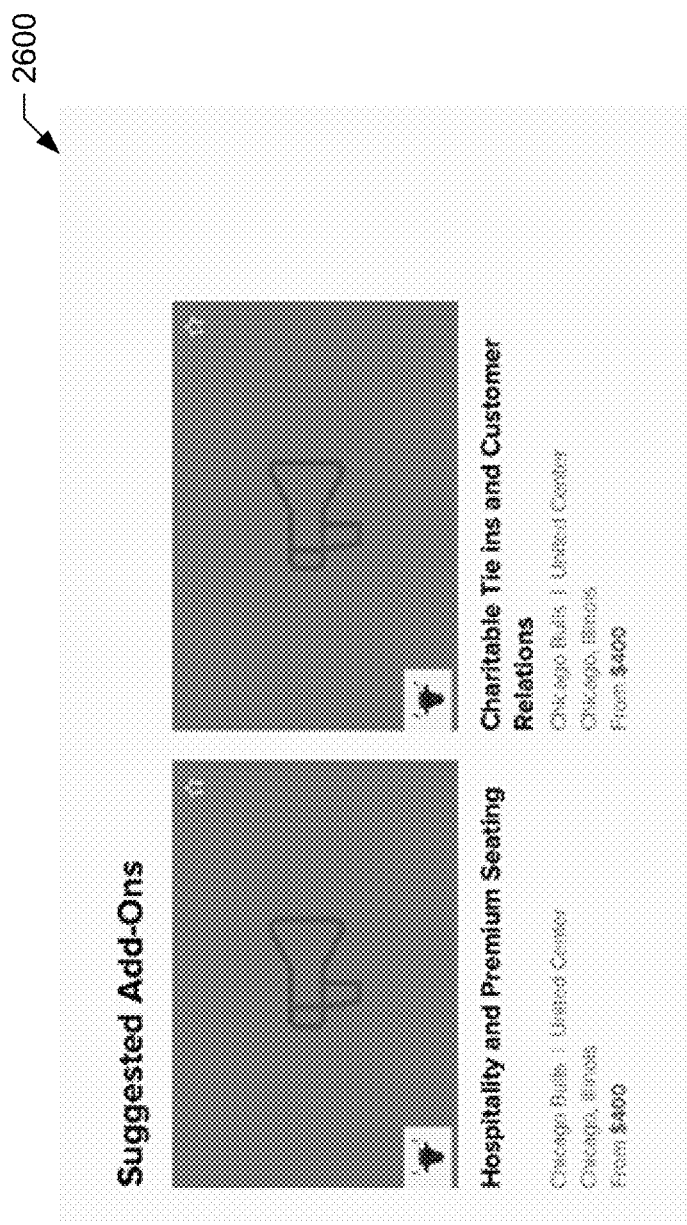
FIG. 26 shows a diagram of a user interface that displays recommended advertising space for purchase, according to an example embodiment of the present disclosure.

The example management server 102 may also be configured to determine recommendations for an advertiser. FIG. 26 shows a diagram of a user interface 2600 that displays recommended advertising space, according to an example embodiment of the present disclosure. The management server 102 may determine the recommendations based on an advertiser's previous purchases or additions to a cart. The management server 102 may additionally or alternatively determine the recommendations based on similar assets that were purchased by other advertisers. Further, the recommended add-on advertising space may be provided based on criteria for the advertiser to meet a minimum threshold for purchase.

The recommendations shown in the user interface 2600 are provided to enhance or expand an advertiser's engagement with spectators in a manner consistent with previous sponsorships or currently viewed sponsorships. The example management server 102 is configured, in some embodiments, to determine recommendations according to one or more rules or algorithms that take into account previous and/or current purchases. For example, the management server 102 may identify other assets in proximity to the selected asset in a venue to increase exposure. The management server 102 may also recommend other similar events as a selected event or recommend assets at other venues/locations. In some instances, the management server 102 may recommend bundles of assets or advertising space, while providing a price for the bundle. For example, after an advertiser has selected an advertising space for a single game during a month, the management server 102 may identify that the asset is only available in a bundle.

In some embodiments, the management server 102 may recommend that an advertiser can purchase "opponent" inventory. In an example, the management server 102 may provide a recommendation to purchase advertising space to promote vacationing in California (California Tourism) when basketball teams from California play the Bulls® at the United Center®. The management server 102 may also determine that a recommendation can be provided for similar advertising space at nearby market arenas such as Wrigley Field® and Guaranteed Rate Field® when teams from California visit those venues. The management server 102 not only provides recommendations to extend exposure in a region but also to time periods outside of time periods initially contemplated by the advertiser (e.g., baseball season instead of just hockey/basketball season).

Figure 27:
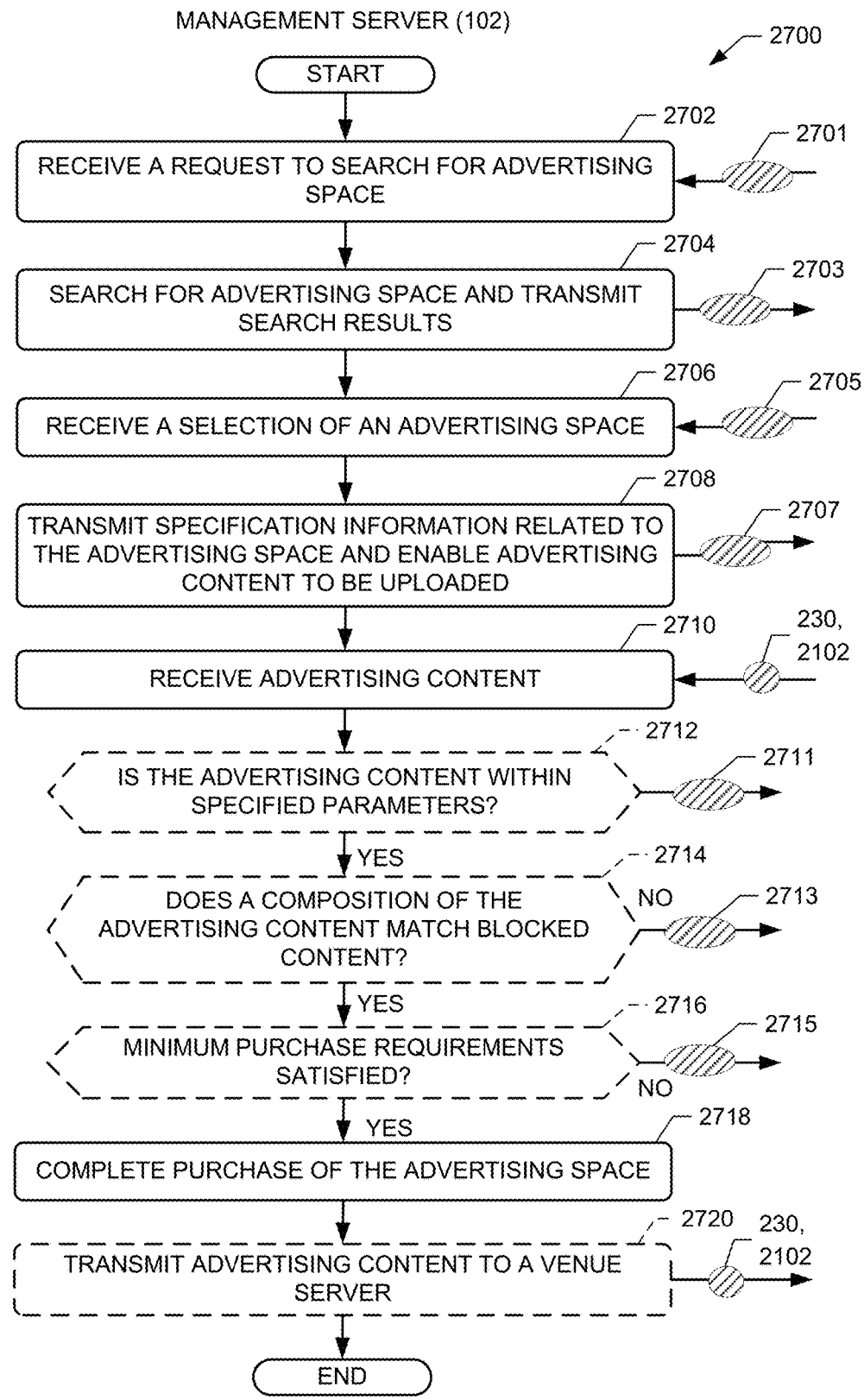
FIG. 27 shows a diagram of an example procedure for purchasing advertising space, according to an example embodiment of the present disclosure.

FIG. 27 shows a diagram of an example procedure 2700 for purchasing advertising space, according to an example embodiment of the present disclosure. Although the procedure 2700 is described with reference to the flow diagram illustrated in FIG. 27, it should be appreciated that many other methods of performing the steps associated with the procedure 2700 may be used. For example, the order of many of the blocks may be changed, certain blocks may be combined with other blocks, and many of the blocks described are optional. Further, the actions or steps described in procedure 2700 may be performed among multiple devices including, for example the management server 102, the advertiser terminals 112 and 114, the venue operator servers 104 and 106, and/or the application 120 of FIG. 2.

The example procedure 2700 begins when the management server 102 receives a request message 2701 to search for advertising space (block 2702). The message 2701 may be received from the application 120 or a web browser on the terminals 112 or 114. The message 2701 may include search criteria for advertising space, such as a date or date range, team name, venue name, market, etc. The management server 102 searches the memory device 222 for advertising space that matches the search criteria (block 2704). The management server 102 also transmits the search results in one or more messages 2703 to the requesting terminal 112 or 114. In some embodiments, the management server 102 compares the search criteria to the specification information associated with each advertising space to determine matches.

The example management server 102 next receives a message 2705 that includes a selection of an advertising space that was provided in the search results (block 2706). In response, the management server 102 accesses the memory device 222 for at least some of the specification information that is associated with the requested advertising space, which is then transmitted in one or more messages 2707 for display in, for example, the user interface 1900 of FIG. 19 (block 2708). The management server 102 and/or the user interface enables advertising content to be uploaded or otherwise provided for the advertising space.

The example management server 102 next receives advertising content 230, 2012 from the application 120 or webpage on the terminal 112 or 114 (block 2710). The advertising content may include one or more images, video, animation, audio, etc. In some embodiments, the management server 102 is configured to compare parameters associated with the advertising content to parameters of the specification information for the advertising space (block 2712). This may include checking if a resolution, size, file size, or file type of the advertising content is within the parameters for the advertising space. If at least one parameter is not satisfied, the management server 102 transmits an error message 2711 to the terminal 112 or 114. The error message 2711 may be indicative of which parameter was not satisfied. In response, an advertiser may provide alternative advertising content.

If the advertising content is within the specified parameters, the management server 102 may determine a composition of the advertising content for comparison to a banned list (block 2714). This may include performing OCR and/or image analysis or template matching to determine a composition of the advertising content. This may also include comparing the composition to a list with text, images, etc. of content that is not acceptable for display within the advertising space. If at least some of the composition matches at least some of the banned content, the management server 102 transmits an error message 2713 to the terminal 112 or 114. The error message 2713 may be indicative of the matching banned content. In response, an advertiser may provide alternative advertising content.

If the advertising content does not include banned content, the management server 102 may determine if a minimum purchase requirement has been satisfied (block 2716). The management server 102 may, for example, include the advertising space with other advertising space in a cart or campaign for comparison to one or more minimum purchase thresholds. Additionally or alternatively, the management server 102 may determine if a minimum amount of units or games have been purchased for the advertising space. If at least one minimum purchase requirement is not satisfied, the management server 102 transmits an error message 2715 to the terminal 112 or 114. The error message 2715 may be indicative of the minimum purchase requirement. In response, an advertiser may increase a number of units purchased for the advertising space or add additional advertising space for purchase.

If the minimum purchase requirements are satisfied, the management server 102 enables a purchase of the advertising space to be completed (block 2718). For example, the management server 102 may enable the application 120 to display a check-out user interface or otherwise accept payment information. In some embodiments, after a purchase has been made, the management server 102 transmits the advertising content 230, 2102 to a venue operator server 104 or 106 (block 2720). The management server 102 may also transmit a message indicative of the advertising space and a requested game, date, time. The example procedure 2700 then ends. In some instances, the procedure 2700 may continue as the advertiser purchases additional advertising space.

Conclusion

It will be appreciated that each of the systems, structures, methods and procedures described herein may be implemented using one or more computer program or component. These programs and components may be provided as a series of computer instructions on any conventional computer-readable medium, including random access memory ("RAM"), read only memory ("ROM"), flash memory, magnetic or optical disks, optical memory, or other storage media, and combinations and derivatives thereof. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Moreover, consistent with current U.S. law, it should be appreciated that 35 U.S.C. 112(f) or pre-AIA 35 U.S.C. 112, paragraph 6 is not intended to be invoked unless the terms "means" or "step" are explicitly recited in the claims. Accordingly, the claims are not meant to be limited to the corresponding structure, material, or actions described in the specification or equivalents thereof.

The invention is claimed as follows:

1. A computerized sponsorship exchange system comprising:
    a memory device configured to store a data structure that includes specification information for advertising spaces for a plurality of venues, the specification information for each advertising space including:
        at least one of a date, a time, or a game that each of the advertising spaces is available for purchase,
        a base purchase price,
        a number of units that are available for the at least one of the date, the time, or the game,
        a minimum resolution threshold, and
        a preview picture including a pictorial representation of the respective advertising space and a venue area around the advertising space, the preview picture having a first area that includes the pictorial representation of the advertising space and the venue area around the advertising space, the pictorial representation of the advertising space having a second area that is less than the first area of the preview picture, the pictorial representation of the advertising space configured to be visually depicted as a blank section within the preview picture and specified by space parameters identifying at least one of a location, a boundary, or the second area of the pictorial representation of the advertising space within the first area of the preview picture;
    an interface controller configured to provide interactive user interfaces for user devices to enable a display and purchase of the advertising spaces in the venues; and
    a processor communicatively coupled to the memory device and the interface controller, the processor in cooperation with the interface controller configured to:
        receive a selection, from a user device, of an advertising space for a specified date that corresponds to a game for a particular venue;
        determine an adjustment to the base purchase price based on the game for the particular venue and a remaining number of units of the advertising space that are available for the game;
        select the preview picture of the advertising space from the memory device based on the user device selection of the advertising space for the specified venue;
        cause the user device to display an upload interactive user interface that prompts a user to provide advertising content for the selected advertising space, the upload interactive user interface including the preview picture of the advertising space with the pictorial representation of the advertising space shown as the blank section;
        receive a file containing advertising content from the user device;
        after the file is received in the processor from the user device, compare a resolution of the received advertising content to the minimum resolution threshold provided within the specification information for the advertising space that is stored in the memory device;
        when the resolution of the received advertising content is below the minimum resolution threshold of the advertising space, cause the user device to display an error message without rendering or displaying the advertising content;
        when the resolution of the received advertising content is greater than the minimum resolution threshold of the advertising space, adjust the advertising content based on the space parameters to fit within the second area of the pictorial representation of the advertising space;
        at least one of replace the blank section of the pictorial representation of the advertising space with the adjusted advertising content, or apply the adjusted advertising content to the blank section of the pictorial representation of the advertising space;
        render the preview picture with the pictorial representation of the advertising space containing the adjusted advertising content;
        cause the user device to display the advertising content within the preview picture at the second area of the pictorial representation of the advertising space;
        receive an acceptance to compete a purchase of the advertising space for the advertising content;
        reserve the advertising space, for the adjusted base purchase price, for the received advertising content for the specified date that corresponds to the game for the particular venue;
        determine a server of a venue operator that is associated with the reserved advertising space;
        transmit the advertising content to the determined server after the advertising content has been reserved for the specified date for the particular venue;
        receive feedback data from the determined server, the feedback data including a confirmation that the advertising content was displayed at the reserved advertising space for the specified date for the particular venue; and store the feedback data in the memory device in conjunction with a record of the completed purchase of the advertising space for the advertising content.

2. The system of claim 1, wherein the processor is further configured to:

perform optical character recognition ("OCR") or image analysis on the advertising content to determine a content composition;

compare the content composition to a plurality of banned content;

enable the acceptance of the advertising content when the content composition does not match the banned content; and cause the interface controller to have the user device display an error message when the content composition matches at least a portion of the banned content.

3. The system of claim 2, wherein the banned content includes at least one of nudity, violence, profanity, negative words or phrases, racial words or phrases, racial images, or words, phrases, or images related to adult products.

4. The system of claim 1, wherein the advertising content includes at least one of an image or a video and the specification information of the advertising space additionally includes at least one of an acceptable file size range, acceptable pixel dimensions, or acceptable image dimensions for the advertising content.

5. The system of claim 4, wherein the processor in cooperation with the interface controller is configured to:

additionally compare a file size, pixel dimensions, or image dimensions of the received advertising content to the specification information of the advertising space in the memory device;

when the advertising content is within the specification information of the advertising space, render the received advertising content; and when the advertising content is outside of the specification information of the advertising space, cause the user device to display the error message without rendering the advertising content.

6. The system of claim 4, wherein the processor in cooperation with the interface controller is configured to display the rendered advertising content by causing the video of the advertising content to play within a media player that has a display area formatted to correspond to the pictorial representation of the advertising space.

7. The system of claim 1, wherein the blank section includes at least one of a blank screen or scoreboard, a greyed-out area, a blacked-out area, or a graphic indicative of the space parameters.

8. The system of claim 1, wherein the interface controller in conjunction with the processor is configured to enable the advertising space to be selected during a session with other advertising spaces from the venue or different venues as part of a package purchase.

9. A computerized sponsorship exchange method comprising:

storing, in a memory device, specification information for an advertising space of a venue, the specification information including:

at least one of a date, a time, or a game that the advertising space is available for purchase, a base purchase price, a number of units that are available for the at least one of the date, the time, or the game, a minimum resolution threshold, and a preview picture including a pictorial representation of the advertising space and a venue area around the advertising space, the preview picture having a first area that includes the pictorial representation of the advertising space and the venue area around the advertising space, the pictorial representation of the advertising space having a second area that is less than the first area of the preview picture, the pictorial representation of the advertising space configured to be visually depicted as a blank section within the preview picture and specified by space parameters identifying at least one of a location, a boundary, or the second area of the pictorial representation of the advertising space within the first area of the preview picture;

receiving, in a processor, a selection from a user device of the advertising space for a specified date that corresponds to a game;

determining, via the processor, an adjustment to the base purchase price based on the game for the particular venue and a remaining number of units of the advertising space that are available for the game;

selecting, via the processor, the preview picture of the advertising space from the memory device based on the user device selection of the advertising space for the specified venue;

causing, via the processor, the user device to display an upload interactive user interface that prompts a user to provide advertising content for the advertising space, the upload interactive user interface including the preview picture of the pictorial representation of the advertising space with the pictorial representation of the advertising space shown as the blank section;

receiving, in the processor, advertising content from the user device;

after the advertising content is received in the processor from the user device, comparing, via the processor, a resolution of the received advertising content to the minimum resolution threshold provided within the specification information for the advertising space that is stored in the memory device;

when the resolution of the received advertising content is below the minimum resolution threshold of the advertising space, causing, via the processor, the user device to display an error message without rendering or displaying the advertising content;

when the resolution of the received advertising content is greater than the minimum resolution threshold of the advertising space, adjusting, via the processor, the advertising content based on the space parameters to fit within the second area of the pictorial representation of the advertising space;

at least one of replacing, via the processor, the blank section of the pictorial representation of the advertising space with the adjusted advertising content, or applying, via the processor, the adjusted advertising content to the blank section of the pictorial representation of the advertising space;

rendering, via the processor, the preview picture with the pictorial representation of the advertising space having the adjusted advertising content;

causing, via the processor, the user device to display the rendered advertising content within the preview picture at the second area of the pictorial representation of the advertising space;

receiving, in the processor, an acceptance to compete a purchase of the advertising space for the advertising content;

reserving, via the processor for the adjusted base purchase price, the advertising space for the received advertising content for the specified date that corresponds to the game for the particular venue;

determining, via the processor, a server of a venue operator that is associated with the reserved advertising space;

transmitting, from the processor, the advertising content to the determined server after the advertising content has been reserved for the specified date for the particular venue;

receiving, in the processor, feedback data from the determined server, the feedback data including a confirmation that the advertising content was displayed at the reserved advertising space for the specified date for the particular venue; and storing, via the processor, the feedback data in the memory device in conjunction with a record of the completed purchase of the advertising space for the advertising content.

10. The method of claim 9, further comprising:
transmitting, via the processor, a message to the server including information indicative of the advertising space and the specified date that corresponds to the game.

11. The method of claim 9, wherein the specification information for the advertising space includes a minimum purchase requirement for the venue, the method further comprising:
determining, via the processor, that acceptance to complete the purchase of the advertising space does not meet the minimum purchase requirement;
preventing, via the processor, the completion of the purchase of the advertising space; and
causing, via the processor, the user device to display information indicative that the minimum purchase requirement has not been met.

12. The method of claim 9, further comprising specifying, via the processor, the blank section of the pictorial representation of the advertising space in the preview picture as an active element for displaying at least one or an image or a video.

13. The method of claim 9, wherein the blank section includes generic advertising content or an example of advertising content.

14. The method of claim 9, wherein the specification information of the advertising space additionally includes at least one of an acceptable file size range, acceptable pixel dimensions, or acceptable image dimensions for the advertising content.

15. The method of claim 14, further comprising:
additionally comparing, via the processor, a file size, pixel dimensions, or image dimensions of the received advertising content to the specification information of the advertising space;
rendering, via the processor, the advertising content when the advertising content is within the specification information of the advertising space; and
causing, via the processor, the user device to display the error message without rendering the advertising content when the advertising content is outside of the specification information of the advertising space.

16. The method of claim 9, wherein the game includes at least a game for professional sports teams, collegian sports teams, or amateur sports teams;
the time includes at least one of a game time, a period, a quarter, or a clock time;
the venue includes at least one of an arena, a stadium, a center, a field, a coliseum, a park, or a pitch; and
the advertising space includes at least one of a video board, a banner board, a small screen, a central scoreboard, or a jumbotron.

17. The method of claim 9, wherein the preview picture includes two pictorial representations of the advertising space, and
wherein the received advertising content is rendered in both of the pictorial representations of the advertising space shown in the preview picture.

18. The method of claim 9, wherein the specification information for the advertising space includes a plurality of preview pictures such that each preview picture is associated with respective space parameters identifying at least one of a location, a boundary, or an area of a pictorial representation of the advertising space within the respective preview picture, and
wherein the received advertising content is rendered in the plurality of preview pictures.

19. The method of claim 9, further comprising:
receiving, in the processor, a request message from the user device with search criteria for advertising spaces;
searching, via the processor, the memory device for at least one advertising space that meets the search criteria using related specification information; and
transmitting, via the processor to the user device, information indicative of the at least one advertising space to enable the selection of the advertising space,
wherein the search criteria includes at least one of a sports market, a venue name, a sports team name, a sports league, a date, an advertising space type, a location exposure, or a budget.

* * * * *